United States Patent [19]
Rivera

[11] Patent Number: 6,045,094
[45] Date of Patent: Apr. 4, 2000

[54] GYROSCOPIC SPACE SHIP/STATION WITH DOCKING MECHANISM

[76] Inventor: Ramon L. Rivera, 7317 Dunfield Ave., Los Angeles, Calif. 90045

[21] Appl. No.: 08/963,433

[22] Filed: Nov. 3, 1997

Related U.S. Application Data

[60] Provisional application No. 60/030,022, Nov. 4, 1996.

[51] Int. Cl.[7] .............................. B64G 1/56; B64G 1/60; B64G 1/64
[52] U.S. Cl. ............................. 244/159; 244/172
[58] Field of Search ............................ 244/158 R, 159, 244/169, 172, 158 A, 161, 173

[56] References Cited

U.S. PATENT DOCUMENTS

| | | | |
|---|---|---|---|
| 3,144,219 | 8/1964 | Schnitzer | 244/159 |
| 4,667,907 | 5/1987 | Hujsak et al. | 244/158 A X |
| 4,730,797 | 3/1988 | Minovitch | 244/159 |
| 4,785,212 | 11/1988 | Downer et al. | |
| 4,872,625 | 10/1989 | Filley | 244/159 |

Primary Examiner—William Grant

[57] ABSTRACT

A space vehicle which is a combined space ship and space station (1), able to combine the functions of a lunar mission transport and a lunar support station. Propulsion rockets (60) are used for translation, and thrusters for attitude control and station keeping. The vehicle (1) inner components (2,8) are rotated to produce variable finite gravities, while the outer components are stationary for zero gravity. The center of vehicle (1) is a vertical main module (2) to which are attached a horizontal network of minor modules (8) to form spokes and periphery of a wheel structure. This module network is rotated by electromagnetic bearings (44, 10) powered by vehicle (1) electricity. The stationary parts of the electromagnetic bearings (48, 14) are connected to truss support assemblies (50, 52, 54, 56, 74, 76, 78, 80, 82) which are at zero gravity. Docking facilities for visiting space ships, such as the Space Shuttle, are attached to a truss support assembly (54). The one-g peripheral modules (8) house the crews and one-g experiments, while spoke modules (8) are devoted to activities at partial gravity. Zero gravity facilities attached to the truss support assemblies (50, 52, 54, 56, 74, 76, 78, 80, 82) include hangars used for satellite retrieval and repair and zero-g experiments, meteor and heat shields, and solar panels for generating vehicle (1) electricity.

16 Claims, 25 Drawing Sheets

FIG. 4
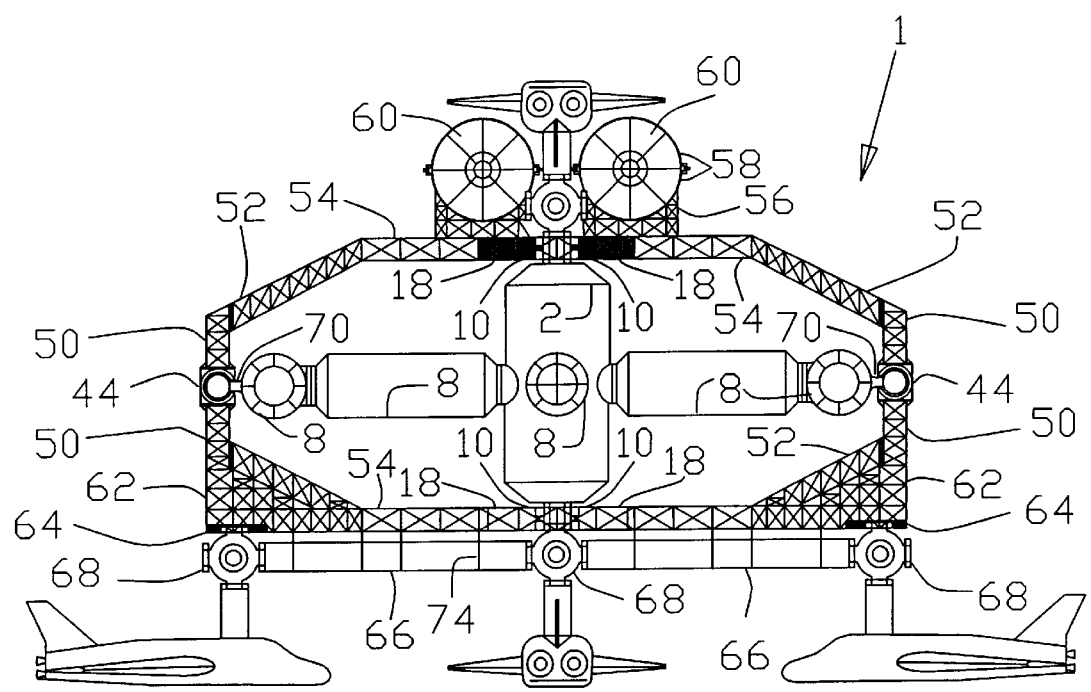
4A
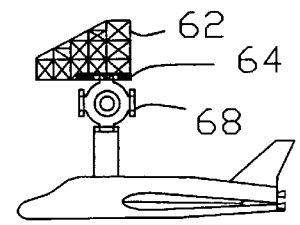

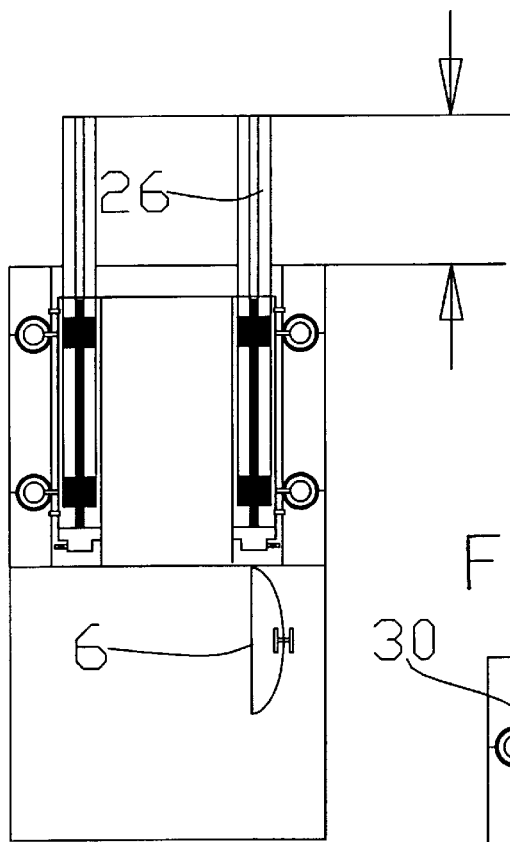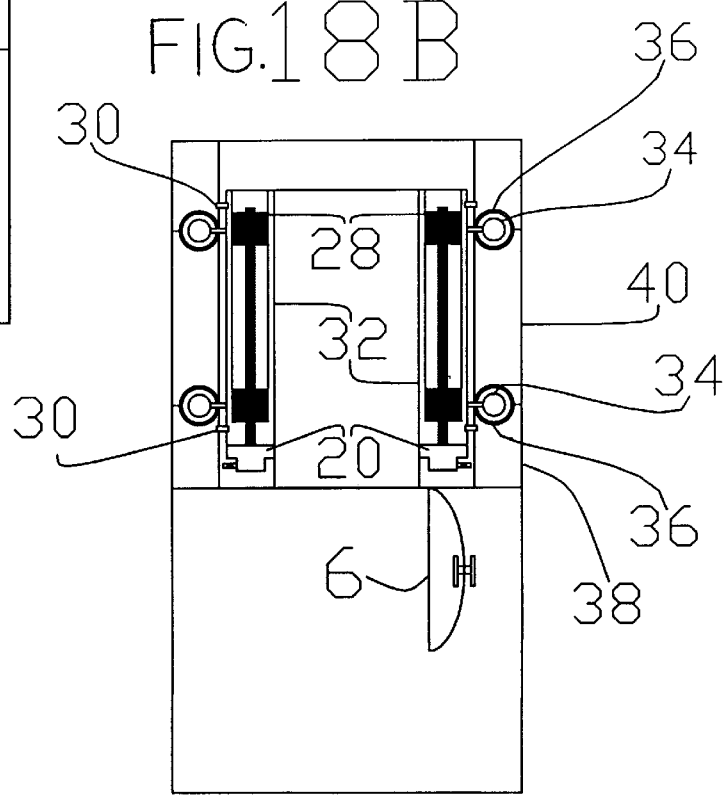

GYROSCOPIC SPACE SHIP/STATION WITH DOCKING MECHANISM

This application claims benefit of Provisional Application No. 60/030,022 filed Nov. 4, 1996.

TECHNICAL FIELD

This invention relates to a new form of space vehicle which is also a space station. More particularly, it relates to a space vehicle with support structures for (1) induced gravity and zero gravity compartments and modules, and (2) propulsion rockets and maneuvering thrusters; and with convenient docking mechanisms, and repair hangars for repairing satellites.

BACKGROUND ART

Space stations in current use or in the design stage operate at zero gravity or with finite gravity induced by rotation. With rotating space stations, a docking space vehicle, such as the U.S. Space Shuttle, must match its approach velocity to the translational and rotational speeds of the space station. This requires exceptional piloting, expensive computer programs, and additional vehicle rocket fuel.

Special features have been devised to alleviate the problem of docking with a rotating space station. Where space station rotation is produced by the use of thrustors, fuel must be expended for stopping and re-starting the rotation. The amount of stored fuel then limits the number of docking maneuvers. Furthermore, additional equipment such as repair hangars and zero gravity modules cannot be installed, because this will result in an unbalanced rotating unit. Also, any additional equipment will have induced gravity, which is undesirable if zero gravity was needed.

Background U.S. Patents in this technical area are:

1964: U.S. Pat. No. 3,144,219 to Schnitzer,
1965: U.S. Pat. No. 3,169,725 to Berglund,
1967: U.S. Pat. No. 3,300,162 to Maynard et al,
1967: U.S. Pat. No. 3,332,640 to Nesheim,
1967: U.S. Pat. No. 3,348,352 to Cummings,
1969: U.S. Pat. No. 3,478,986 to Fogarty,
1973: U.S. Pat. No. 3,744,739 to Weaver et al
1977: U.S. Pat. No. 4,057,207 to Hogan,
1981: U.S. Pat. No. 4,299,066 to Thompson, and
1982: U.S. Pat. No. 4,308,699 to Slysh.

DISCLOSURE OF THE INVENTION

The principal object of this invention is to create a dual purpose space ship/space station which reduces the cost of and time required for any series of space experimentation or exploration projects.

Another object is a space ship/space station which can vary in size by means of modular construction, so that a number of space science experiments can be carried out simultaneously.

A further object is a space ship/space station on which zero gravity and full gravity experiments can be performed at the same time.

It is also an object to improve space ship/space station crew health and safety by avoiding known zero gravity bio-hazards such as skeletal calcium depletion and space sickness.

It is another object to create a space ship/space station which provides multiple docking at zero gravity.

It is a further object to provide a space ship/space station with structure capable of accommodating a variety of add-on equipment.

It is also an object to provide a space ship/space station which is an experimental model to serve as a prototype for future commercial space ships and space stations.

It is another object to provide a space ship/space station with a repair hangar on its non-rotating mass for satellite retrieval and repair.

It is a further object to provide a space ship/space station which can accommodate an astronomical observatory in space.

It is also an object to provide a space ship/space station which can be used to recover large space debris from past launches and so aid in removal of navigational hazards.

To implement these objects a combination space ship and space station has been devised. This can be used as a space ship for interplanetary voyages or as a space station for near-earth orbiting. This space ship/space station is ideally suited as a lunar mission transport and as a lunar mission support station. To function as a space ship, two or four propulsion rockets are used for translation, and pairs of thrustors for attitude control. To function as a space station, the pairs of thrustors are used alone for station-keeping.

The present space ship/space station invention has four configurations: A,B,C and D. The configurations differ in the location of (1) the propulsion rockets, (2) the number of rockets, and (3) added docking stations for visiting space ships. In all configurations the rocket locations are arranged for maximum distance between rockets and crew locations, for maximum safety. This allows sufficient room for shielding if nuclear propulsion is used, without sacrificing space for crew areas or adding mass to the rotating modules, which would increase the electrical power required for the electromagnetic bearing assemblies.

Configuration A has one pair of rockets in a dorsal location astride the longitudinal centerline of the space ship/space station. Configuration B has the same location for the pair of rockets, but differs from all other configurations in that zero gravity docking stations have been added. Configuration C has two rockets mounted on the side. Configuration D has four rockets installed on the stern.

To provide a range of gravitational environments from zero g to one-earth g, certain components of the space ship/space station are rotated for finite gravities while others are stationary for zero gravity.

The center of the space ship/space station is a zero-g or micro-g vertical main module in the form of a hollow vertical cylinder to which are attached a horizontal network in the form of a spoked wheel of minor modules which also are essentially hollow cylinders. The minor modules are used for crew quarters, laboratories, workshops, communication centers, flight control and storage. Depending on the activities to be carried out in the space ship/space station, the number of modules can be varied by varying the number of spokes in the spoked wheel network.

Rotation of the main and minor modules is accomplished by the use of magnetic levitation provided by three electromagnetic bearing assemblies, each essentially a rotating inner ring within a stationary outer ring, powered by onboard electricity. Use of electricity instead of thrustors to impart rotation avoids the need of extra thrustor fuel for rotation purposes. Depending on rotational speed and radial location from the main module center, finite gravities up to one earth gravity are created in the minor modules.

Additionally, the zero gravity stationary parts of the electromagnetic bearing assemblies are connected to truss support assemblies which make up the framework suspending the mechanical bearings for the rotating modules about a vertical axis.

The zero gravity truss support assemblies support stationary pylons to which are attached the propulsion rockets, hangar facilities, antennas and all other assemblies that may require a zero gravity environment. Maneuvering thrusters are installed on the stationary part of an electromagnetic bearing assembly which is connected to the truss support assemblies. The only other zero or micro gravity location is the central main module. For health reasons the crew quarters are located in a one-g environment at the periphery of the spoked wheel minor module network. Two to four docking stations for visiting space ships, such as U.S. Space Shuttles, are included in the zero gravity portion outboard of the module wheel network.

The space ship/space station is designed to have a multi-purpose hangar for use in retrieval and repair of satellites, or as a space-based astronomical observatory, a zero gravity experimental laboratory, as a storage area for long duration flights, or as a manufacturing facility for items requiring zero gravity. In addition, man-made space debris from previous space launches may be captured, diminishing chances for spacecraft colliding with space debris.

A meteor shield doubling as a solar heat shield is installed on the space ship/space station. The meteor shield can also have solar panels fastened to its outer surface. If nuclear power is used for propulsion, there is ample room for shielding the nuclear reactor which can be placed in a separate module as far as possible from crew quarters. In case of accident the nuclear module can be jettisoned.

Most of the assemblies making up the space ship/space station of the present invention are symmetrical and interchangeable, thus reducing construction time and cost. They are designed to be launched on the Space Shuttle, except that the main central vertical module may have to be launched individually in a protective enclosure. Three different propulsion rocket locations are available, and solar panels generating electricity for onboard use can be installed outboard of the vertical truss support assemblies.

This space ship/space station is designed to be built using present-day technology and presently available subassemblies. No technological breakthroughs are required. The design allows for growth and modifications for generations to come, thus increasing its value and reducing its lifetime cost.

BRIEF DESCRIPTION OF THE DRAWINGS

The drawings show four configurations of the basic space ship/space station design, designated "A", "B", "C" and "D".

FIG. 4 is a front view of Configuration B which has two dorsal rockets and also accepts docking of four Space Shuttles, with FIG. 4A being a view of one of the docking stations.

FIGS. 18A and 18B are cutaway views of the telescopic rotating tunnel in the expended position and in the retracted position, respectively.

BEST MODE FOR CARRYING OUT THE INVENTION

Figure 1:
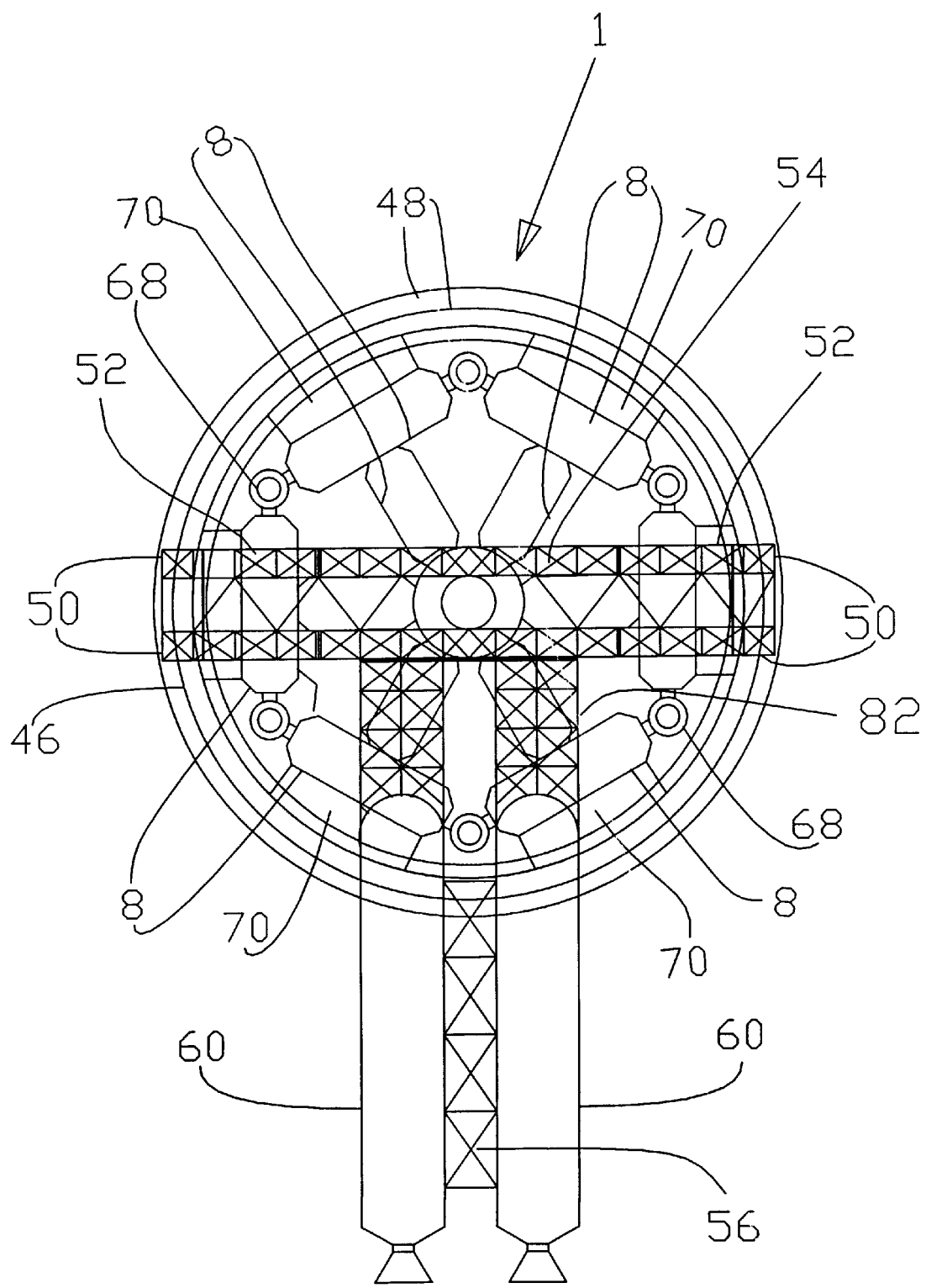
FIG. 1 is a top view of Configuration A which has two propulsion rockets in dorsal mounting.

FIG. 1 is a top view of the dorsal rocket mounting Configuration A of the space ship/space station assembly of the present invention, indicated generally at 1. The central hub of assembly 1 is a vertical module 2. Access into and out of assembly 1 is through access tunnels 4 which are located at the upper and lower ends of module 2. At its centerline module 2 has ports comprising node assemblies 68 or airlocks 72.

Minor modules 8 are connected to node assemblies 68 or airlocks 72 to form spokes of a wheel. To the outboard ends of spoke-forming minor modules 8 are connected other minor modules 8 having ports in the inboard centerline to form diagonal connections. The diagonal connections have ports in both ends which connect the diagonal connections to other nodes or minor modules 8 to form the rim of the wheel structure.

To the outboard side of outer modules 8 is attached pylon assembly 70, which, in turn, is connected on its outboard side to the main electromagnetic inner magnetic ring 46 to form the rotating part of assembly 1. Ring 46 is supported on electro-magnetic bearing assembly 44. Attached to the upper and lower surfaces of bearing assembly 44 are two vertical truss support assemblies 50, one on each side of assembly 1. Attached to each vertical truss support assembly 50 is the lower end of one of two diagonal truss support assemblies 52. The upper end of each diagonal truss support assembly 52 is connected to the outboard end of one of two horizontal truss support assemblies 54, one on the upper side of assembly 1 and the other on the lower side of assembly 1.

When assemblies 50, 52 and 54 are united, they form four truss bridgeworks spanning the width of assembly 1, two on the upper side of assembly 1 and two on the lower side of assembly 1, located forward and aft of the horizontal centerline of assembly 1. Connected to the aft horizontal truss support assembly 54 are the dorsal truss support assemblies of which there are two, the left and the right.

Longitudinal truss support assemblies 82 are located to the left and right of the longitudinal centerline of assembly 1. Assemblies 82 are attached two-thirds along the distance from their forward ends to aft horizontal truss supports 54. At their lower side assemblies 82 are connected to aft vertical truss supports 78 which are attached to the upper surface of main electromagnetic bearing assembly 44.

Attached to the lower aft side of vertical truss support 78 is aft diagonal truss support lower end 80. Attached to the forward, lower side of aft vertical truss support 78 is the lower aft end of forward diagonal truss support 80. The forward end of aft diagonal truss support 80 is attached to the forward lower end of vertical truss support 78. On the aft side of the aft dorsal truss support assembly the combined dorsal trusses support rockets 60 which provide propulsion for assembly 1.

Figure 2:
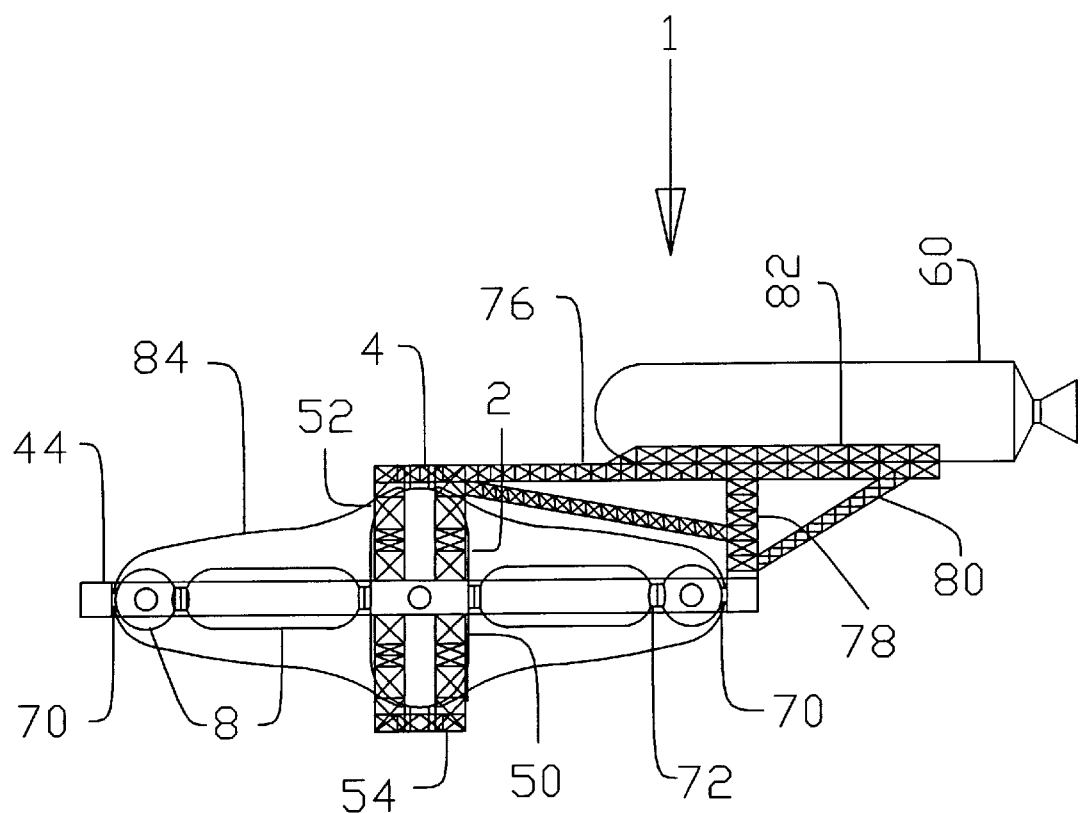
FIG. 2 is a side view of Configuration A.

FIG. 2 is a side view of Configuration A, the dorsal rocket mounting configuration of assembly 1. Vertically mounted in the center is main vertical module 2. The upper and lower ends of module 2 contain access tunnels 4 which provide entry and exit to assembly 1. Attached perpendicular to and radiating out from module 2 are minor modules 8, arranged in a hub and spoke formation. The attachment means are node assemblies 68 or airlocks 72. Outer minor modules 8 are connected perpendicular to inner minor modules 8 to form a wheel.

Outer minor modules 8 have attached to them on their outboard side and in the longitudinal centerline pylon assembly 70 which is connected on its outboard side to the inboard side of electromagnetic bearing assembly inner rotating magnetic ring 46. Not shown, for clarity, are upper and lower electromagnetic bearing assemblies 10. Covering rotating modules 2 and 8 is a small meteor shield 84. Shield 84 also acts as a solar heat shield and can be attached to truss supports 54 or to rotating modules 2 and 8.

Attached to the upper and lower sides of main electromagnetic bearing assembly 44 are truss supports 50, 52 and 54. Vertical truss support 50 is attached to main bearing assembly 44, and is attached on its top inboard side to the lower outboard end of diagonal support assembly 52. The top inboard end of assembly 52 is connected to the outboard end of horizontal truss support assembly 54 which supports upper and lower magnetic bearing supports 16, not shown for clarity.

Figure 3:
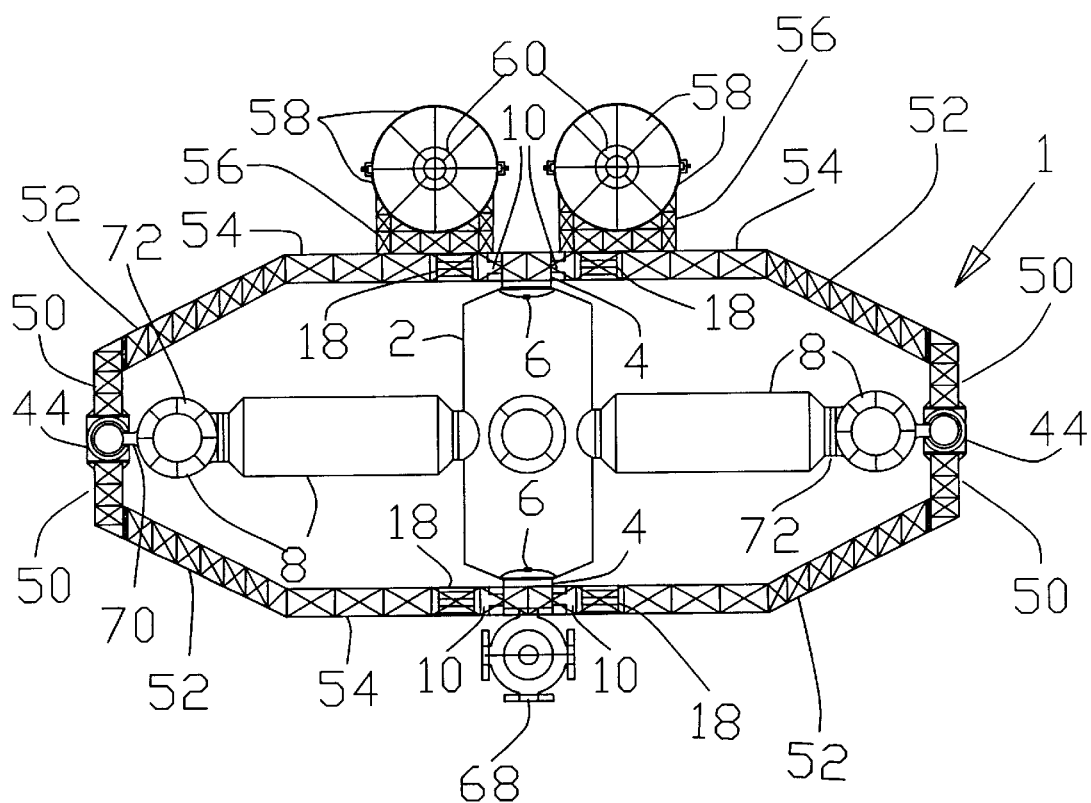
FIG. 3 is a front view of Configuration A.

FIG. 3 is a front view of Configuration A, the dorsal rocket mounting configuration of assembly 1. At the center is vertical main module 2. At the upper and lower ends are access tunnel hatch assemblies 6, and outboard in the vertical axis are access tunnels 4. Outboard of access tunnels 4 are the upper and lower electromagnetic bearing assemblies 10, which help main electromagnetic bearing assembly 44 to create the electromagnetic field which produces the levitation effect and rotational motion. Outboard of bearing 44 are bearing support assemblies 18.

Radiating from the center of main module 2, in hub and spoke fashion, are minor modules 8 which are connected to main module 2 and to each other via node assemblies 68 or airlocks 72. The inboard minor modules 8 are installed perpendicular to main module 2 to form the spoke configuration. Outboard minor modules 8 have connecting ports at each end and one in the inboard side on the center line of module 8. Outer modules 8 connect to imnner modules 8 at the centerline ports to form the rim of the rotating wheel.

Outboard modules 8 have installed on their outboard side and at the longitudinal centerline a pylon assembly 70 which connects module 2 to inner rotating magnetic bearing 34 of main electromagnetic bearing assembly 44 which is comprised of outer stationary magnetic ring 48, inner rotating magnetic ring 46 and bearing housing 49. On the upper and lower surfaces of main electromagnetic bearing assembly 44 are attached vertical truss support assemblies 50. Above, inboard and diagonally are placed diagonal truss support assemblies 52 which are connected to horizontal truss support assemblies 54.

Installed on the top surface of horizontal truss assemblies 54 are rocket support pylons 56 to support rockets 60 and distribute the thrust loads of rockets 60 which are installed on rocket support cradles 58 which are installed on pylon assembly 70. Support cradles 58 are cylindrical and fit over rockets 60 like sleeves which are made to part in the center of the longitudinal center line of assembly 1. Cradles 58 may be bolted together or have quick release latches, and also act as shields against small meteors and as solar heat shields.

At the lower end of main module 2 and outboard of access tunnels 4 is optional node assembly 68 which fits over rotating tunnel 25 if and when additional lower docking stations are installed on the port and starboard beam of assembly 1. Meteor shield 84 has been omitted from FIG. 3 for clarity.

FIG. 4 is a front view of Configuration B of the dorsal rocket mounting configuration of assembly 1. It differs from Configuration A in that two docking stations are added at the port and starboard beams. The additional assemblies are the left hand and right hand truss support assembly 62 attached to the lower section of lower forward vertical truss support 50 and to lower diagonal truss support 54. Attached at the lower side of added truss assembly 62 is node support assembly 68 which has a docking capture ring 42 at its lower end for shuttle docking. Outboard docking nodes 68 are connected to center node 68 by means of left hand and right hand tunnel assemblies 66 which are held in place by tunnel supports 74. Meteor shield 84 has been omitted for clarity.

Figure 5:
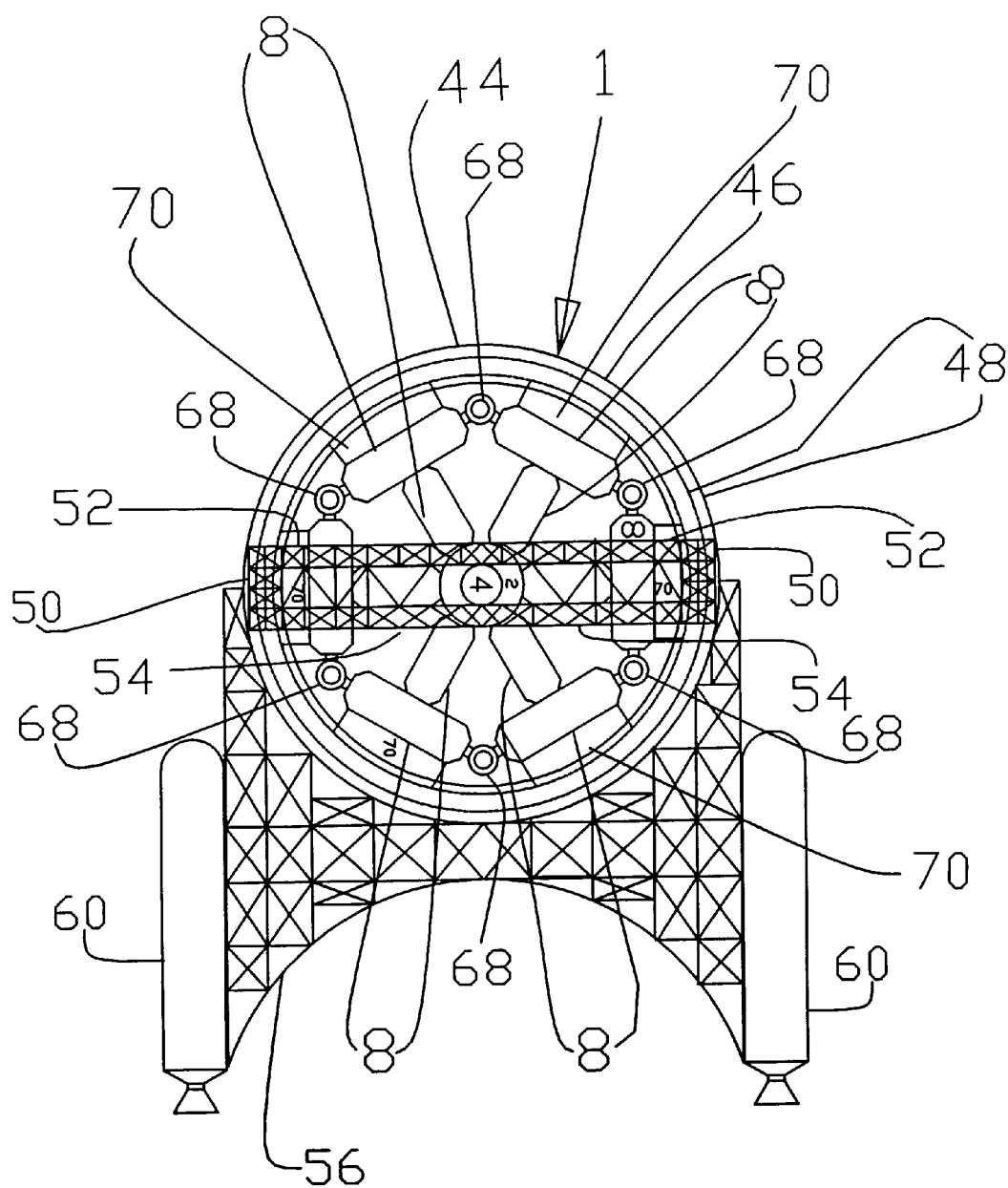
FIG. 5 is a top view of Configuration C which has side-mounted rockets installed on pylons.

FIG. 5 is a top view of Configuration C, the side-mounted rocket configuration of the space ship/space station of the present invention. It differs from Configurations A, B and D, in that rockets 60 are located on the port and starboard quarter of assembly 1. There is no dorsal truss support assembly, the truss support and pylon being one unit 56 spanning the rear of electromagnetic bearing assembly 44 from the horizontal centerline and extending semicircularly aft. Rockets 60 are attached to unit 56.

Figure 6:
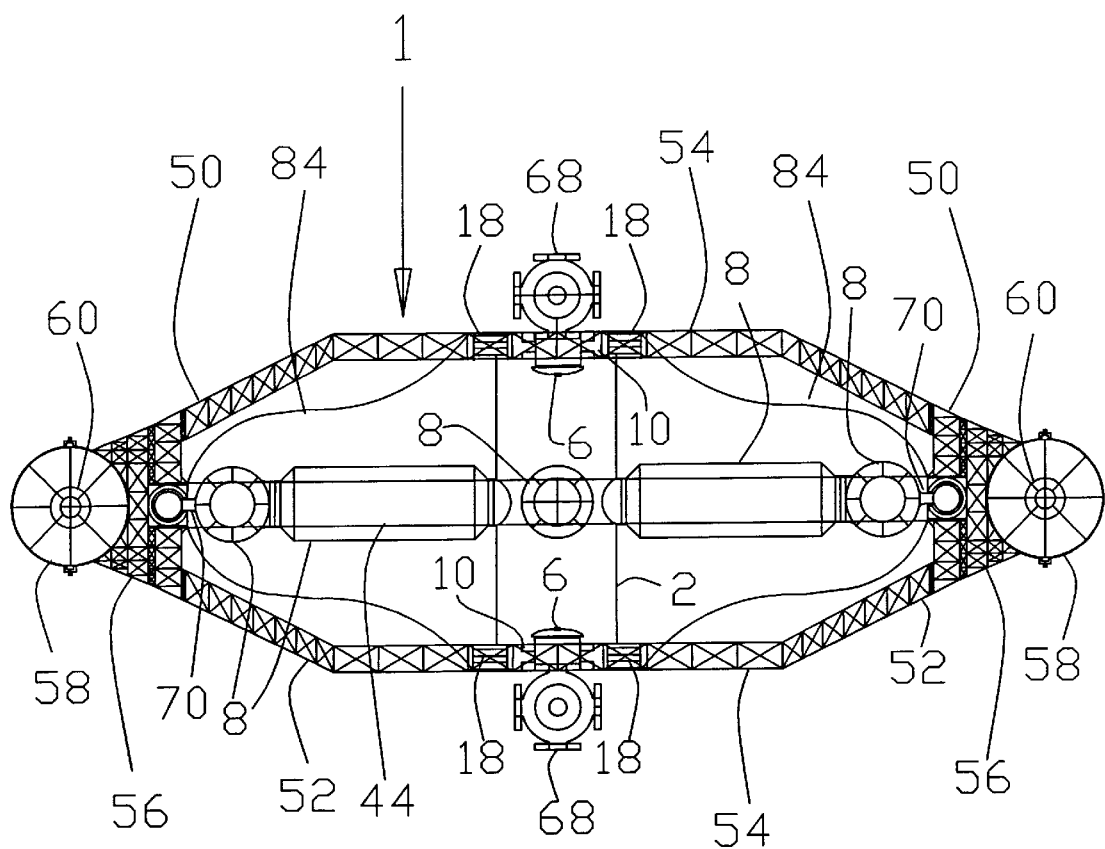
FIG. 6 is a front view of Configuration C.

FIG. 6 is the front view of Configuration C, with rockets 60 installed on pylon 56 which is attached to upper and lower forward vertical truss assemblies 50 and main electromagnetic bearing housing 49. Visible are upper and lower forward diagonal truss supports 52 and horizontal truss support assembly 54. At the center is main vertical module 2 and horizontal minor modules 8 radiating from main module 2. Also seen are airlocks 72, modules 8 to main bearing inner magnetic rotating ring 34, pylon 70, main electromagnetic bearing assembly 44, and meteor shield assembly 84.

At the upper and lower ends of main module 2 are located access hatch 6, upper and lower access tunnels 4 outboard of hatch 6, and upper and lower electromagnetic bearings 10 located outboard and attached to access tunnels 4. Located outboard and attached to bearing assembly 44 are bearing supports 18. Docking nodes 68 are located at the 12 o'clock and 6 o'clock positions.

Figure 7:
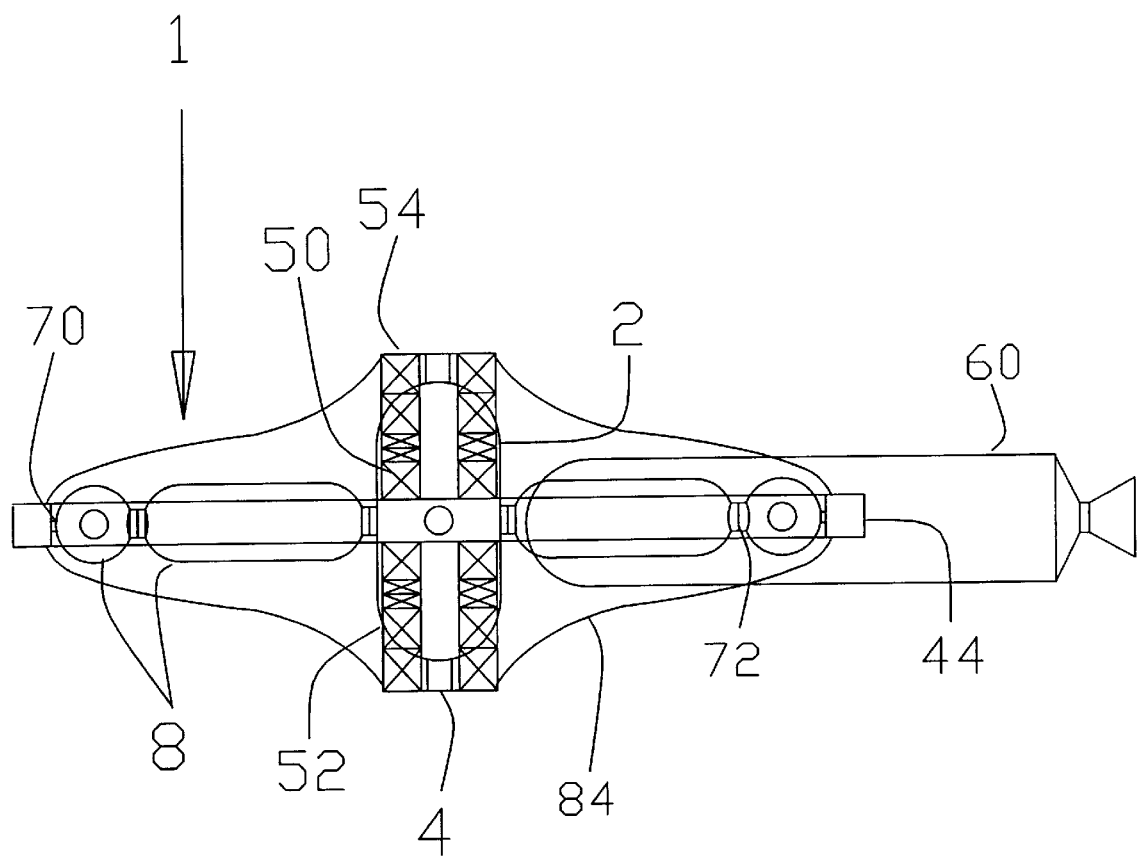
FIG. 7 is a side view of Configuration C.

FIG. 7 is a side view of Configuration C, with minor modules 8 attached via airlocks 72 to central module 2. Attached to the outboard side of minor modules 8 are electromagnetic inner rotating ring 34 and pylon 70. Also shown on top and bottom of main module 2 are access tunnels 4. At the horizontal centerline is main electromagnetic bearing assembly 44. On the vertical centerline are the forward and aft main truss support assemblies 50, 52 and 54. At the rear on the horizontal centerline are rockets 60. Meteor shield 84 is also visible, covering the rotating module assemblies.

Figure 8:
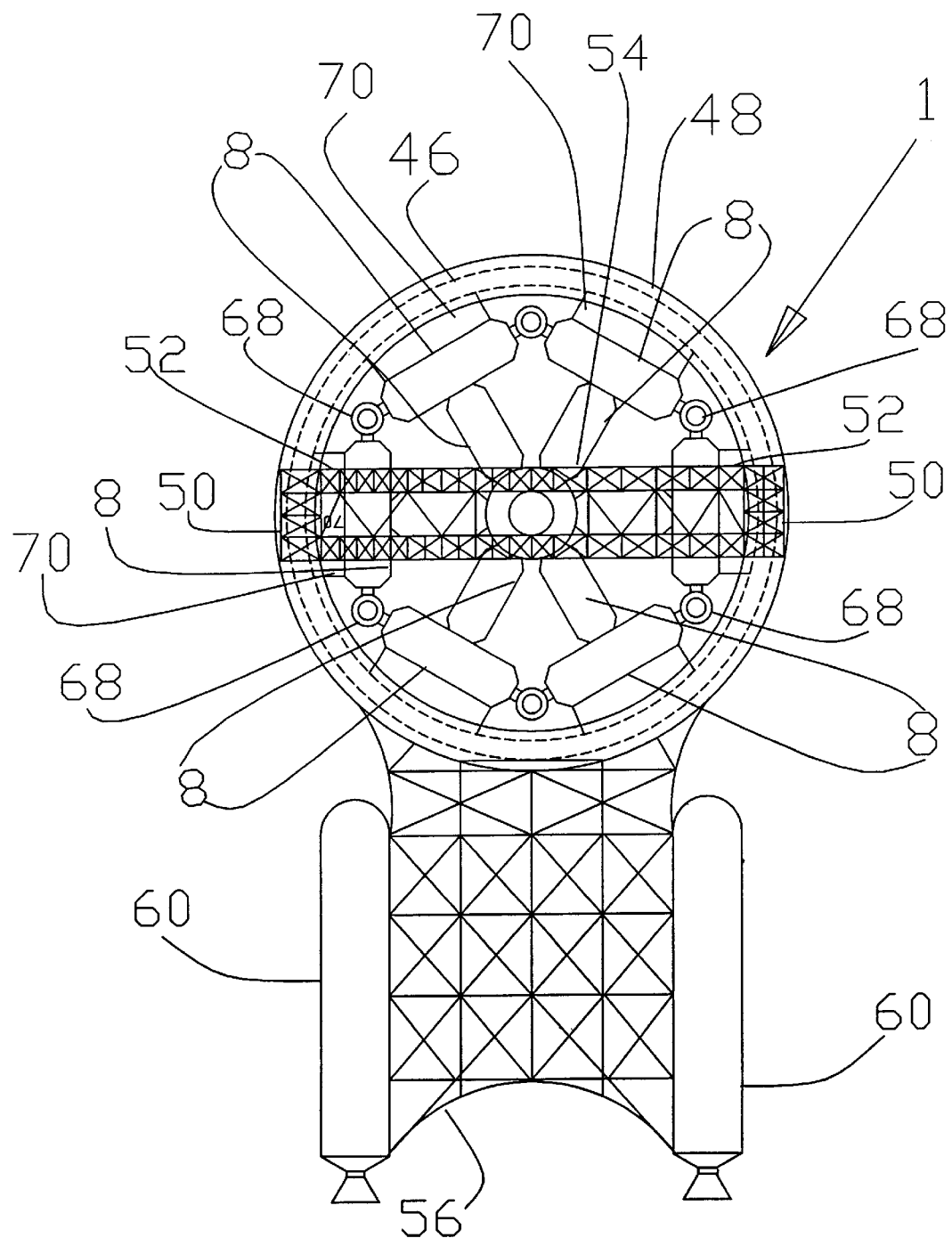
FIG. 8 is a top view of Configuration D which has four rockets installed in two pairs in piggy-back fashion.

FIG. 8 is a top view of Configuration D, the aft rocket mounting configuration of the space ship/space station of the present invention. Configuration D differs from the other configurations in that pylon 70 and rockets 60 are located on the rear of assembly 1. Everything forward of pylons 70 is identical to Configurations A, B and C, and everything functions in the same way. At the center is top access tunnel 4, and main vertical module 2.

The outboard ends of forward and aft horizontal truss support assemblies 54 connect to the inboard ends of diagonal truss support assemblies 52 which connect to the top end of vertical truss support assemblies 50. The lower end of assemblies 50 connect to the upper and lower surfaces of main electromagnetic bearing 44.

Radiating from main vertical module 2 are inner minor modules 8 which are connected perpendicular to main module 2 and to outer minor modules 8. All minor modules 8 form a hub-and-spoke wheel arrangement. The outboard side of outer minor modules 8 have attached to their longitudinal centerline pylons 70 which connect to rotating inner magnetic bearing 46 of main electromagnetic bearing assembly 44, upper access tunnel 4, electromagnetic bearing 10 and its support. Meteor shield 84 is not shown for clarity.

Figure 9:
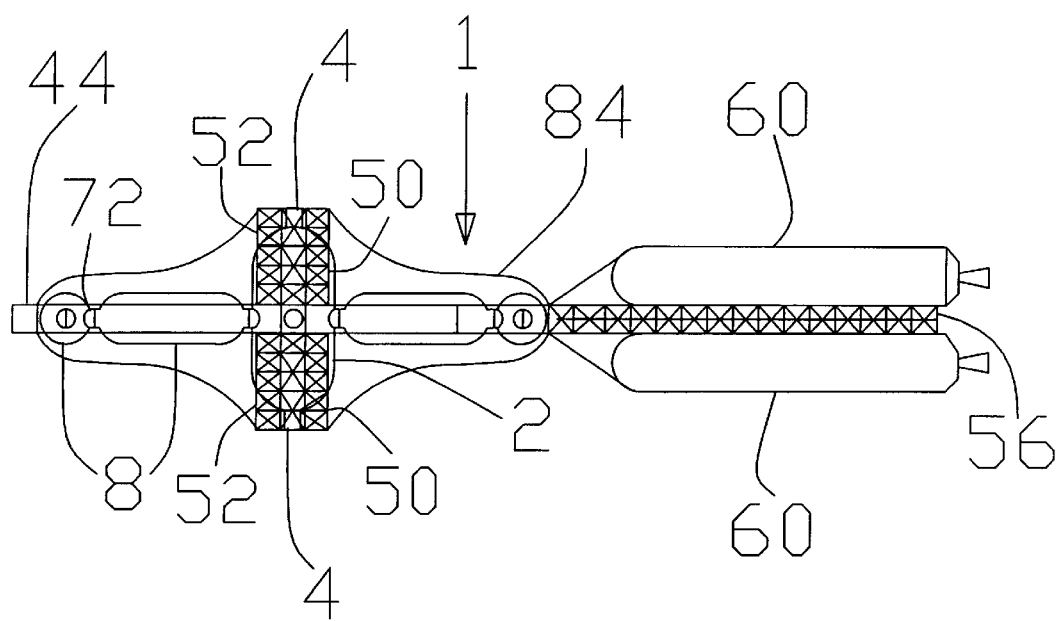
FIG. 9 is a side view of Configuration D.

FIG. 9 is a side view of Configuration D. Shown are main vertical module 2, upper and lower access tunnels 4, and horizontal truss support assembly 54 the outboard ends of which attach to the inboard ends of diagonal truss support assembly 52. The outboard ends of diagonal truss support assembly 52 connect to the top inboard side of vertical truss support assembly 50 which is attached at its other end to electromagnetic bearing assembly 44.

Radiating from center module 2 are minor modules 8, with inner minor modules 8 having ports at each end. Minor modules 8 are attached perpendicular to main module 2 to form a hub-and-spoke arrangement. Outboard minor modules 8 are attached perpendicular to inner minor modules 8. Outer minor modules 8 have three connecting ports, one at each end and the third on the inboard centerline. Where outboard modules 8 connect with the outboard ends of inner modules 8 to form a wheel, modules 8 are connected to each other by airlocks 72 or nodes 68. Also visible is meteor shield 84 which is also a solar heat shield.

On the aft end of assembly 1 rockets 60 are mounted on rocket pylon support assembly 56 which is attached to the aft half of electromagnetic bearing assembly 44. Not shown for clarity are engine support cradle 58, upper and lower minor electromagnetic bearing assemblies 10, and associated bearing support assemblies 18.

Figure 10:
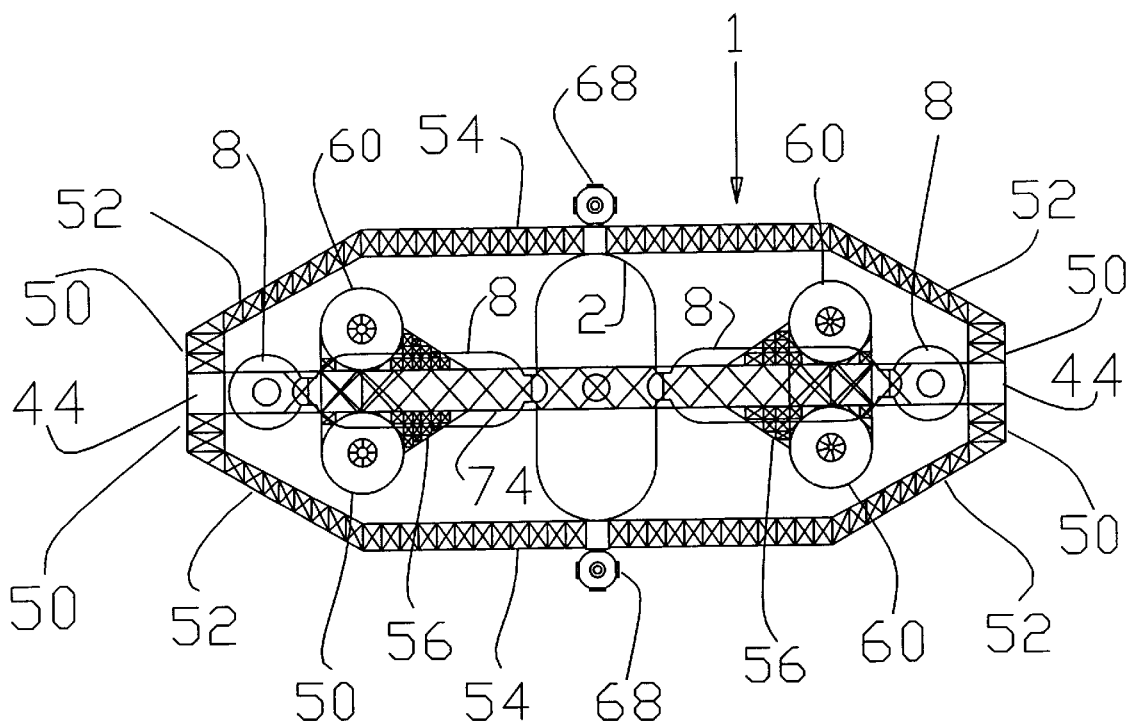
FIG. 10 is a rear view of Configuration D, with FIG. 10A being an exploded view of the rocket pylons and engine pylon truss support assembly.

FIG. 10 is a rear view of Configuration D. Visible are upper and lower docking nodes 68, which are optional for docking. Nodes 68 are attached on their inboard side to outboard ends of upper and lower access tunnels 4. Also visible are main module 2 and airlocks 72 whivch connect minor modules 8 to each other. Outboard modules 8 are connected to pylon assembly 70 which is connected to inner rotating main electromagnetic ring 34. Attached to upper and lower surfaces of electromagnetic bearing assembly 44 are upper and lower vertical truss support assembly 50 which is connected to the outboard end of diagonal truss support 52 whose inboard end is connected to the outboard end of horizontal truss support assembly 54.

Figure 10A:
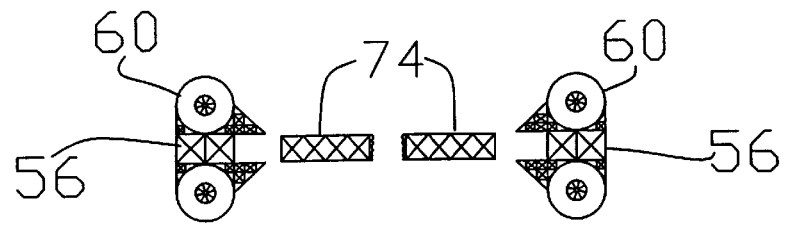

On the aft horizontal centerline of main electromagnetic bearing assembly 44 is attached rocket support pylon assembly 56. Installed on pylons 56 are two rockets 60 in a piggy-back configuration. FIG. 10A is an exploded view of rocket pylons 56 and engine pylon truss support assembly 74, with rockets 60 shown installed on pylons 56.

Figure 11:
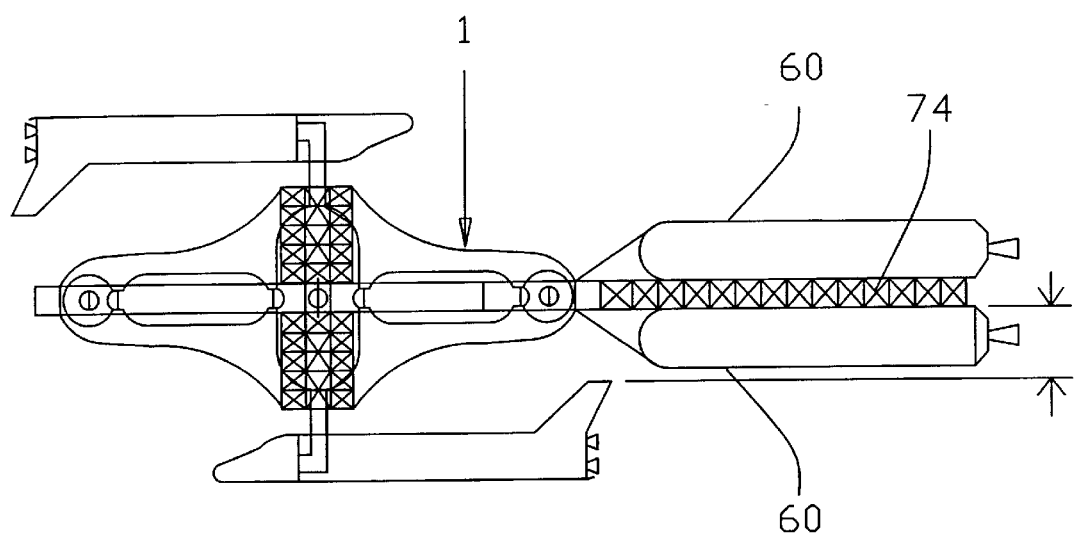
FIG. 11 is a side view of Configuration D showing a two-ship docking operation.

FIG. 11 is a side view of Configuration D. Shown are two space shuttles docked with assembly 1. One shuttle has docked conventionally, approaching the space ship/space station from the front and below. The other shuttle has approached the space ship/space station from the stern in an inverted flight approach. The arrows aft of rockets 60 mark the clearance distance between the vertical stabilizer of the shuttle and pylon support assembly 74.

Figure 12:
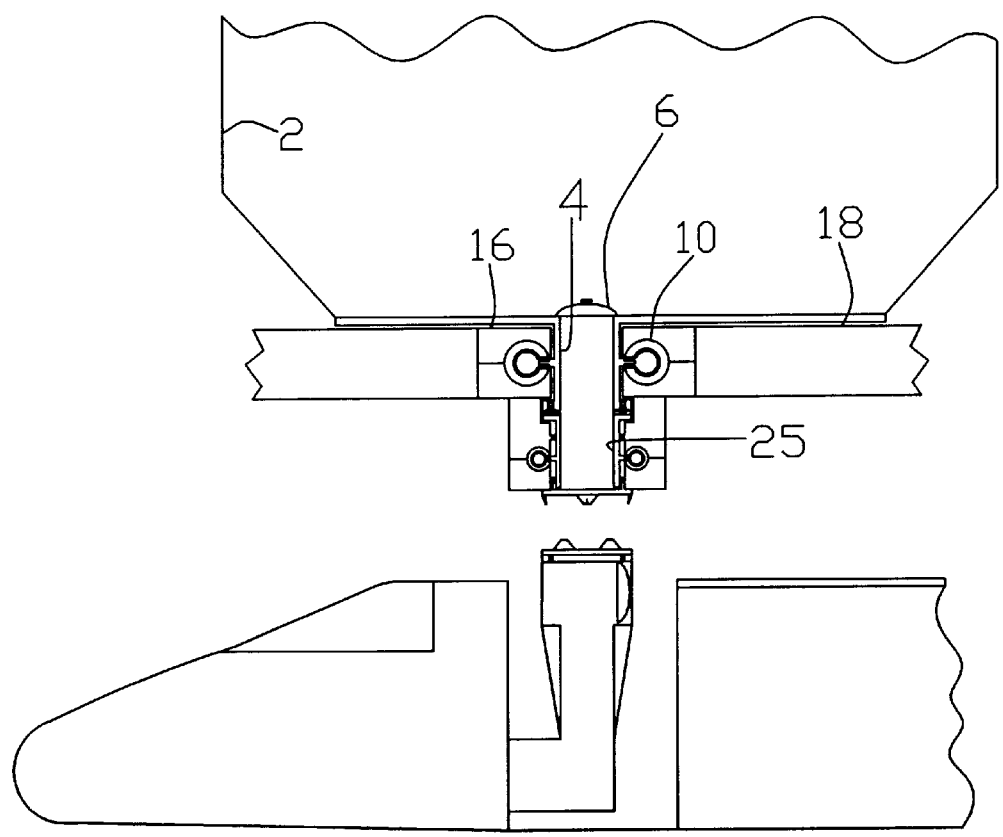
FIG. 12 is a cutaway view of the lower access tunnel and rotation mating tunnel of the main module, with the Space Shuttle in a docking maneuver with the space ship/space station.

FIG. 12 is a cutaway view of the lower end of main vertical module 2 along with lower access tunnel hatch 6 which is attached to access tunnel 4. Also visible is the lower rotating non-telescopic tunnel assembly 25 which is attached to its tunnel support 18. The docking capture ring 42 is outboard of rotating tunnel 25 and attached to the tunnel magnetic bearing supports 38. The space shuttle is below rotating tunnel 25 and docking ring 42, aligned with docking capture ring 42 for docking.

Figure 13:
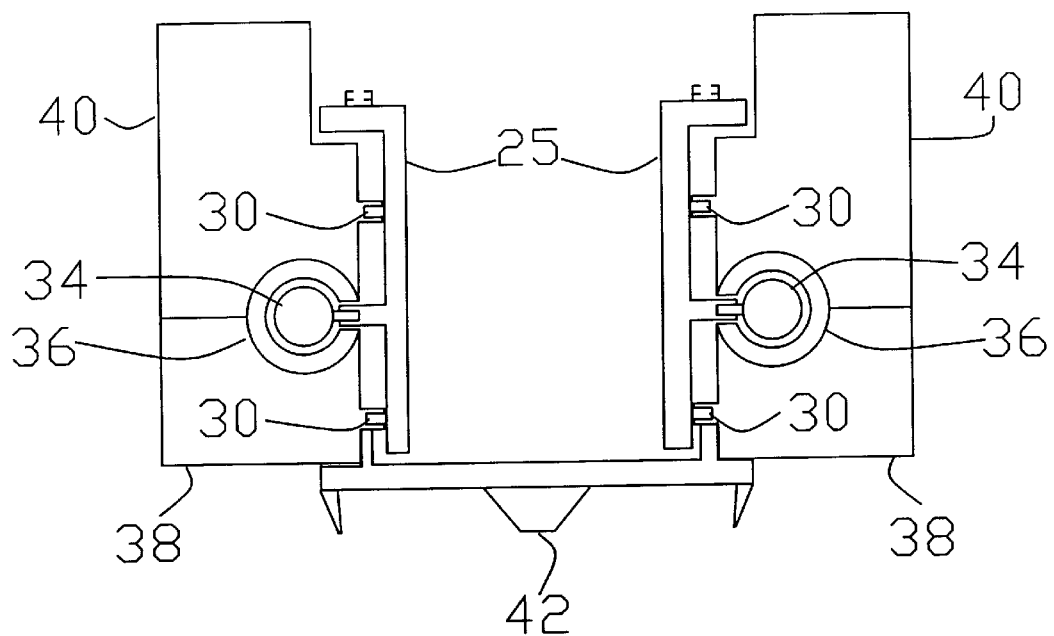
FIG. 13 is a cutaway view of the upper and lower rotating tunnel assemblies.

FIG. 13 is a cutaway view of rotating non-telescopic tunnel assembly 25 which is a pressure sealed hollow cylinder which rotates inside another cylinder of larger inside and outside diameters. The pressure boundary is provided by two sealed bearings 30 whose inside diameter is designed for a press fit between tunnel 25 and sealed bearings 30. The outside diameter of sealed bearings 30 is fitted to the inside diameter of rotating tunnel supports 38 and 40 which also support magnetic bearing assembly 44.

The top surface of rotating tunnel 25 has a raised ring built in with evenly spaced holes for mating with and locking to main module access tunnel 4 when both tunnel 25 and tunnel 4 are rotating at the same speed. Tunnel 25 rotates by way of its own electromagnetic bearing assembly 33 which provides both levitation and propulsive power when in operation. Electromagnetic bearing 10 of tunnel 25 consists of inner rotating magnetic ring 34, outer stationary magnetic ring 36, upper bearing support 40, lower bearing support 38, and associated electrical circuitry.

The side of support 40 that faces inboard in the vertical axis attaches to horizontal truss support assembly 54. Attached to the lower surface of bearing support 38 is docking capture ring 42.

Figure 14:
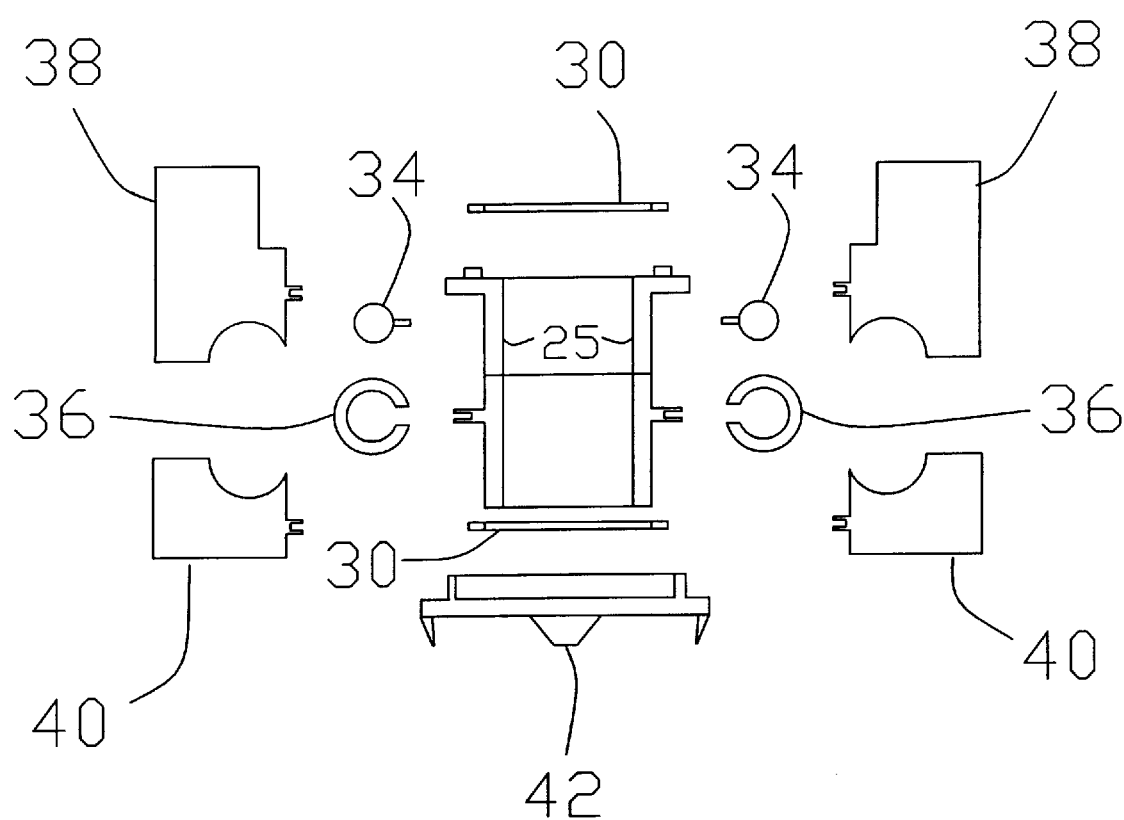
FIG. 14 is an exploded view of the upper and lower rotating tunnel assemblies.

FIG. 14 is an exploded view of non-telescopic rotating tunnel assembly 25 at the center of which is tunnel 25 which can be built in two sections as shown, with an upper half and a lower half. For installation of sealed pressure boundary bearings 30, one bearing 30 for the upper half and the other bearing 30 for the lower half, only one bearing 30 is necessary to create the pressure boundary.

The second bearing 30 is for additional safety in pressurization maintenance. The top surface of the top half of rotating tunnel 25 has built into it a raised ring with evenly spaced holes under which are self-centering nuts 28 which accept the insertion of the rotating jackscrews 22 which drive the circular pressurization seal assembly 21 which mates with and seals rotating tunnel 25 to main module access tunnel 4 which rotates with ship 1. Below lower sealed bearing 30 is stationary docking capture ring assembly 42 which is connected to the lower end of electromagnetic bearing assembly support which is semi-cylindrical in design and made up of two halves 38 and 40 to form a cylinder. The inside surface of halves 38 and 40 is cylindrical, but the outside may be cylindrical or rectangular.

Above lower bearing support 38 is located upper bearing support 40 which is similar in design to lower support 38, except that it is taller. Both supports 38 and 40 have semi-circular cutouts which contain electromagnetic bearing assembly 31 when supports 38 and 40 are mated. Shown are electromagnetic bearing stationary outer ring 36, and inner rotating magnetic ring 34 which attaches to the outside of rotating tunnel 25 to form one rotating unit.

Figure 15:
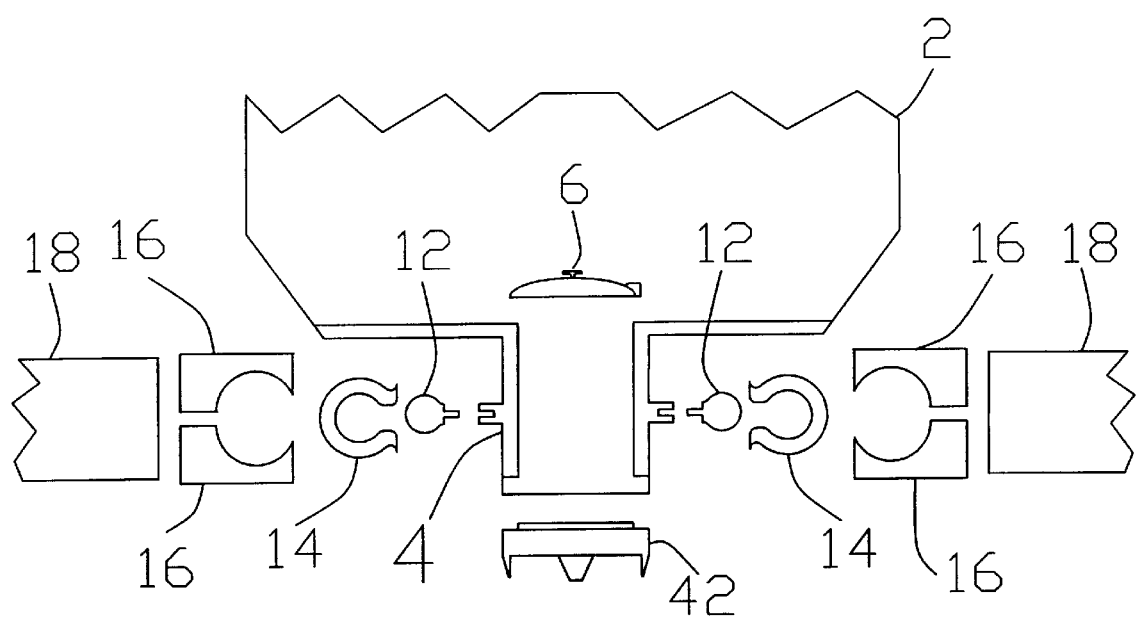
FIG. 15 is an exploded view of the upper and lower ends of the main module.

FIG. 15 is an exploded view of main vertical module assembly lower access tunnel 4 with tunnel hatch 6 which attaches to the inboard side of tunnel 4. Outboard of tunnel 4 is rotating inner magnetic ring 12 which rotates inside outer stationary magnetic ring 14. Both inner and outer magnetic rings 12 and 14 and associated circuitry comprise electromagnetic bearing assembly 10 which is contained in bearing housing 16.

Bearing housing 16 is made up in two sections which have semicircular cutouts in their mating surfaces on the horizontal center line. The interior surface of housing 16 is cylindrical to fit around magnetic rings 12 and 14. The upper and lower sections of housing 16 are mirror images of each other and are designed to be interchangeable. The outboard surface of supports 16 can be circular, but a rectangular design is better for mating with bearing assembly support 18 which is connected to horizontal truss support 54.

Below access tunnel 4 is shown docking capture ring assembly 42, to be used only when a telescopic rotating tunnel with capture ring is installed on the Space Shuttle as well. When both tunnels have the same rotational speed, the Space Shuttle tunnel telescopes toward access tunnel 4 of space ship 1, and the capture rings engage to connect the Space Shuttle to space ship 1. This arrangement is the same in structure and function on upper access tunnel 4 of space ship 1.

Figure 16:
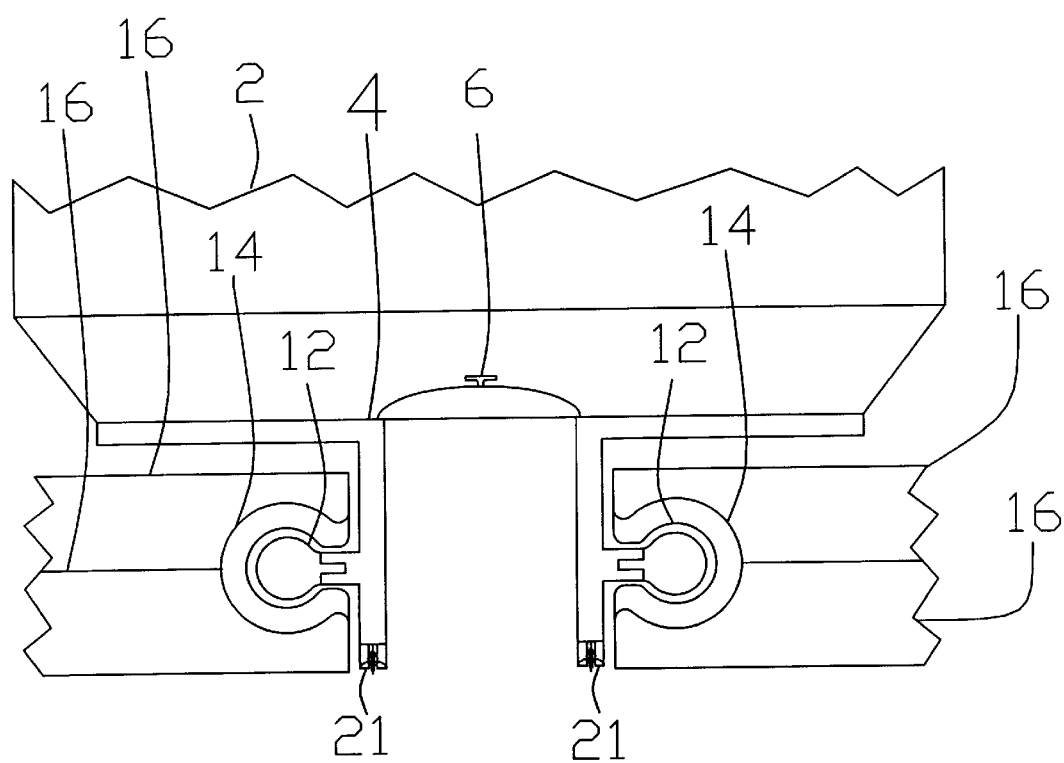
FIG. 16 is a cutaway view of the upper and lower ends of the main module.

FIG. 16 is a cutaway view of the main module lower access tunnel area and lower electromagnetic bearing assembly. Shown are main module 2, lower access tunnel 4 and tunnel hatch 6. On the bottom of access tunnel 4 is installed the tunnel pressure seal assembly 20, which locks and seals access tunnel 4 to rotating tunnel 25 which is located outboard of access tunnel 4 and attached to horizontal truss support assembly 54. Seal assembly 20 is not used with rotating telescopic tunnel assembly 26 which is used on the Space Shuttle.Outboard of tunnel 6 is inner rotating magnetic ring 12 which rotates inside outer stationary magnetic ring 14. Surrounding and housing electromagnetic bearing 10 are magnetic bearing housings 16, which are divided along the horizontal centerline in the form of two mirror image components. The inside surface of housings 16 is circular and together with the lower surface has a semicircular cutout to contain electromagnetic bearing assembly 10 which consists of inner ring 12 and outer ring 14. For clarity, magnetic bearing housing support 18 is not shown.

Figure 17:
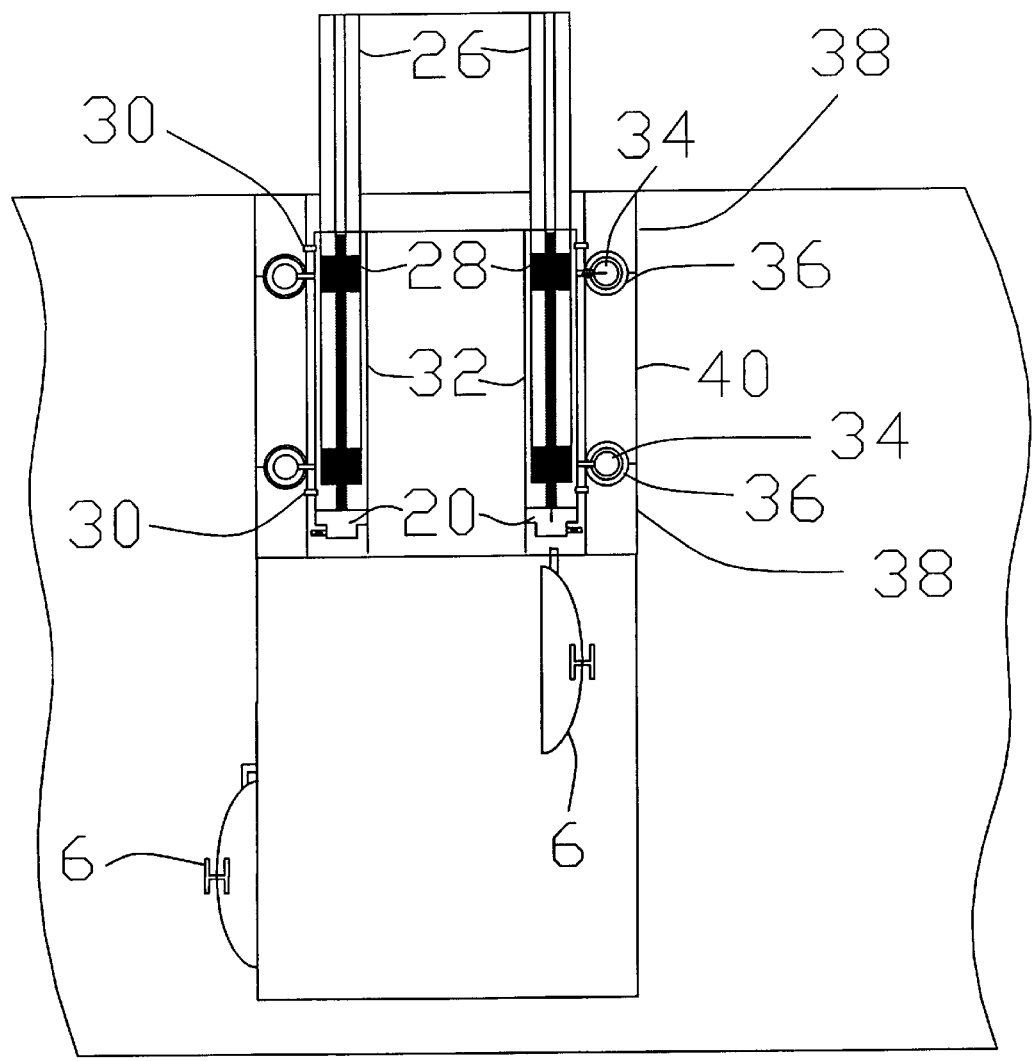
FIG. 17 is a cutaway view of the installation of the telescopic rotating tunnel.

FIG. 17 is a cutaway view of rotating telescopic tunnel assembly 26, whose telescopic section is shown at the center top. Fixed to the inside and at the lower surface of the telescopic section is self-aligning nut 28 which receives electrically powered jackscrew 20 which drives the telescopic section upward for extension and downward for retraction into rotating tunnel housing 32. The jackscrew 20 mechanism is attached inside housing 32 at the lower end. On the outer surface of housing 32 near top and bottom are located two sealed bearings 30 which provide a pressure boundary when tunnel 26 is in operation, by creating a seal which prevents pressure loss from the Shuttle to space.

Rotating telescopic tunnel 26 is equipped with an upper and a lower electromagnetic bearing assembly 33, which operate similar to other bearings on assembly 1. The inner rotating magnetic ring 34 rotates inside stationary magnetic ring 36. The rings are connected to three bearing housings. The center housing 40 is the longer of the three, while upper and lower housings 38 are identical and interchangeable.

Tunnel hatch 6 is attached to tunnel housing assembly 32. Space shuttle hatch 6 is connected to the Space Shuttle. The rotating telescopic tunnel assembly 26 is connected to the space shuttle inner structure. For clarity, docking capture ring assembly 42, which would be located at the top of rotating telescopic tunnel 26 is not shown.

FIGS. 18A and 18B are cutaway views of rotating telescopic tunnel assembly 26, showing tunnel 26 in its extended and retracted positions respectively. Other elements are identical to those in FIG. 17.

Figure 19:
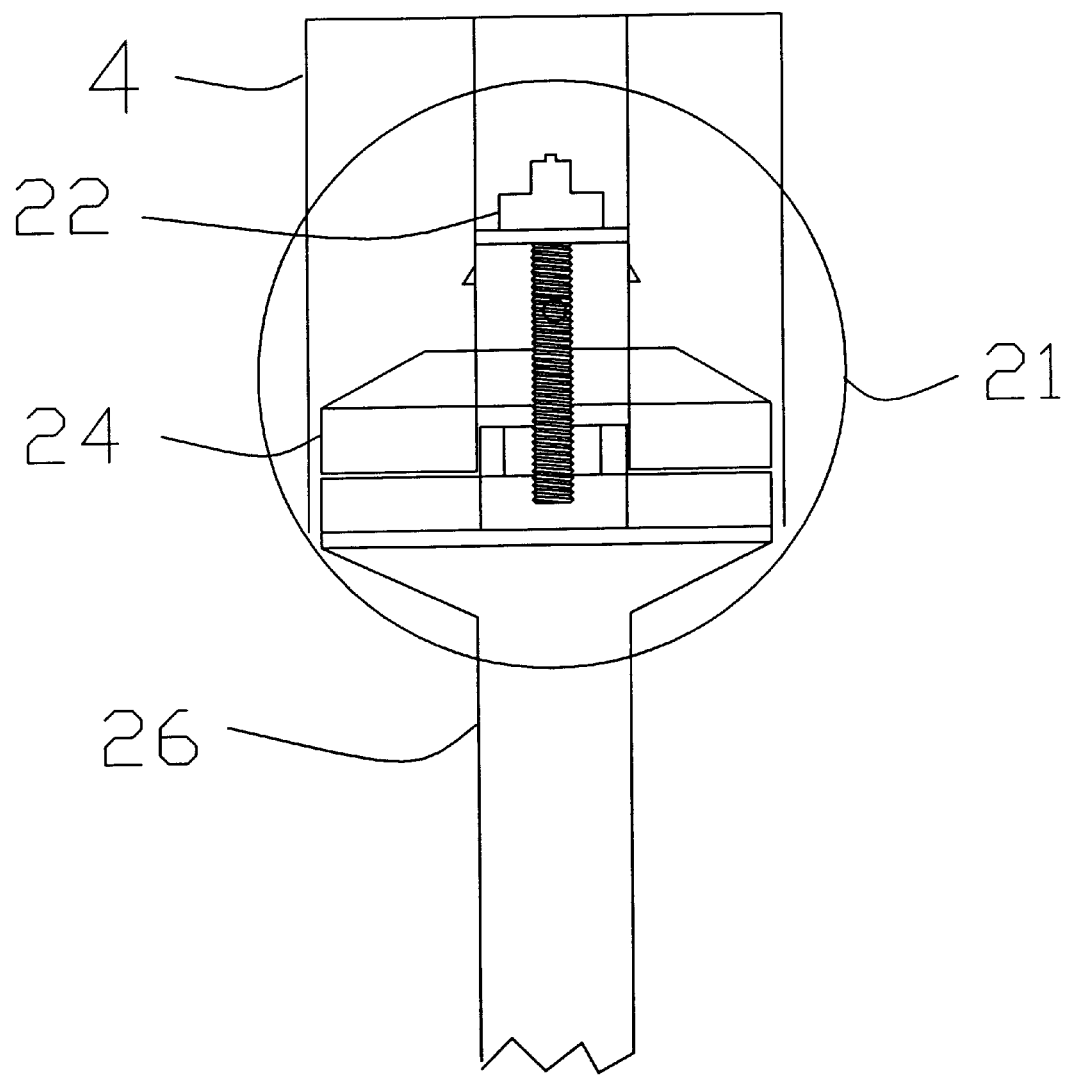
FIG. 19 is a cutaway view of the pressure seal assembly used to seal a module access tunnel to the rotating tunnel.

FIG. 19 is a cutaway view of pressurization seal assembly 20 of rotating tunnel 26. Seal assembly 21 is attached to the lower end of access tunnel 4 of main module 2. Operation is via electrically powered jackscrews 22 which are evenly spaced in a circle. Rotating tunnel 26 has a raised ring surface on its upper edge which also has evenly spaced holes in a ring pattern. Self-aligning nuts 28 are attached inboard of the circular holes in the interior of rotating tunnel 26.

When jackscrews 22 are energized, they travel toward rotating tunnel 26, driving pressurization seal 24 toward rotating tunnel assembly 26. Upon contact, jackscrews 22 enter the holes and screw themselves into self-aligning nuts 28 to form one seal rotating unit. Shown are lower section of access tunnel 4, and upper portion of rotating tunnel assembly 26.

Figure 20:
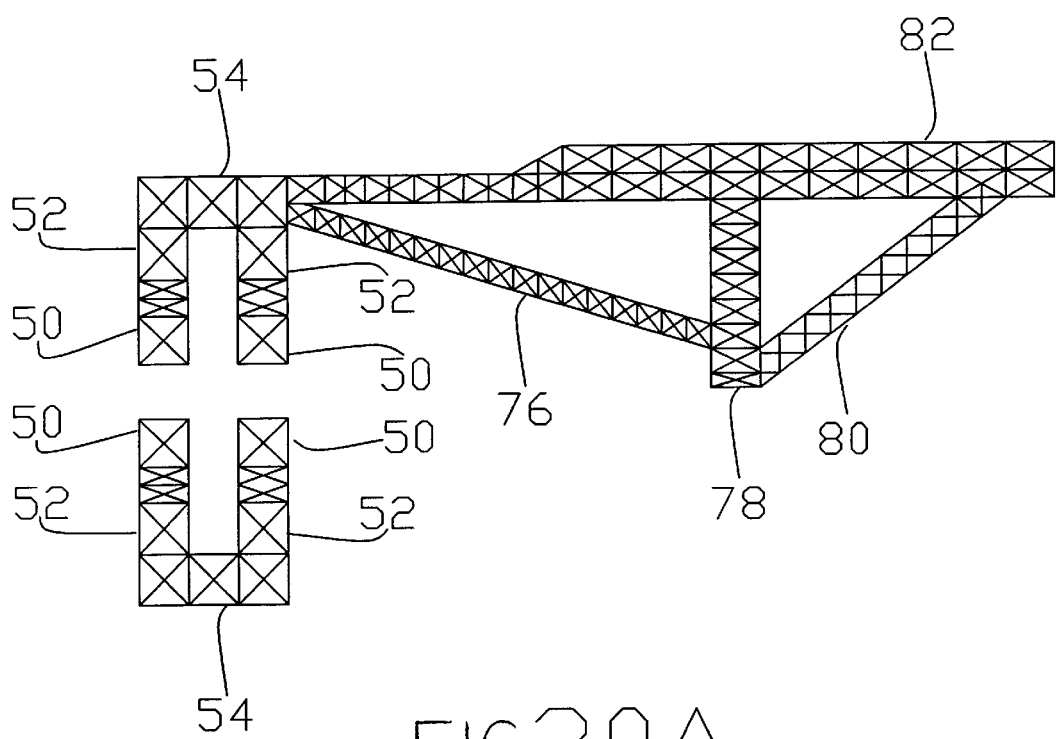
FIG. 20 is a side view of the truss support assemblies, with FIG. 20A showing a right hand view.

FIG. 20 is a side view of Configuration A, the dorsal mounting configuration of the space ship/space station of the present invention. Shown are forward vertical truss support assembly 50 which connects to the upper and lower surface of electromagnetic bearing assembly 44. Connected to truss support assembly 50 and bearing assembly 44 are diagonal truss support assembly 52 and horizontal truss support assembly 54. The resulting bridge work spans assembly 1 just forward and just aft of the horizontal centerline, producing two parallel structures spanning assembly 1.

Attached perpendicular to aft horizontal truss support 54 are parallel longitudinal support assemblies 82 which connect at their forward end to the aft end of horizontal truss support assembly 54. Aft vertical truss support assembly 78 attaches to longitudinal truss support assembly 82 on its lower side, at two-thirds the distance from its forward end.

The lower end of aft vertical truss support assembly 78 connects to the top surface of main electromagnetic bearing 44 at the 5 o'clock and 7 o'clock positions.

Attached to the lower aft portion of vertical truss support 50 is the forward end of aft diagonal truss support assembly 52 whose aft end is attached to the lower aft end of longitudinal truss support 82. The forward dorsal longitudinal truss support 76 connects to the forward lower portion of aft vertical truss support 78. The forward end of the dorsal forward longitudinal truss support 76 connects to the aft section of the aft horizontal truss support 54 and to the forward end of longitudinal truss support 76.

Figure 20A:
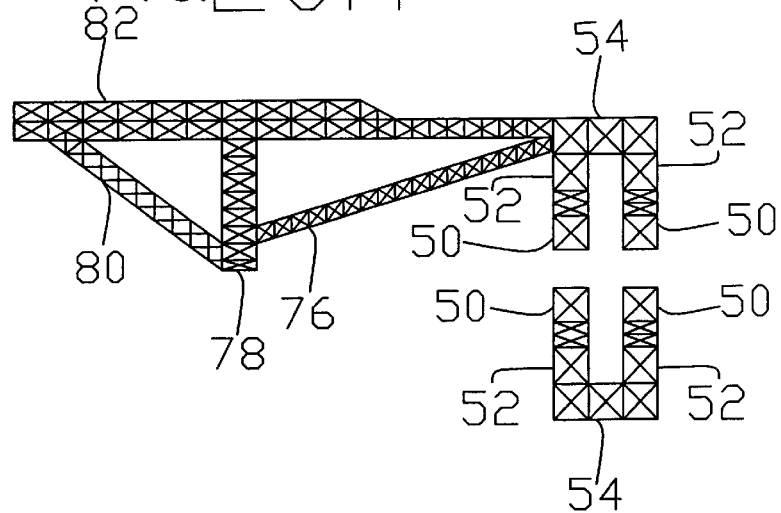

FIG. 20A shows the right hand view of the truss assemblies. The right and left longitudinal truss support assemblies are interchangeable.

Figure 21:
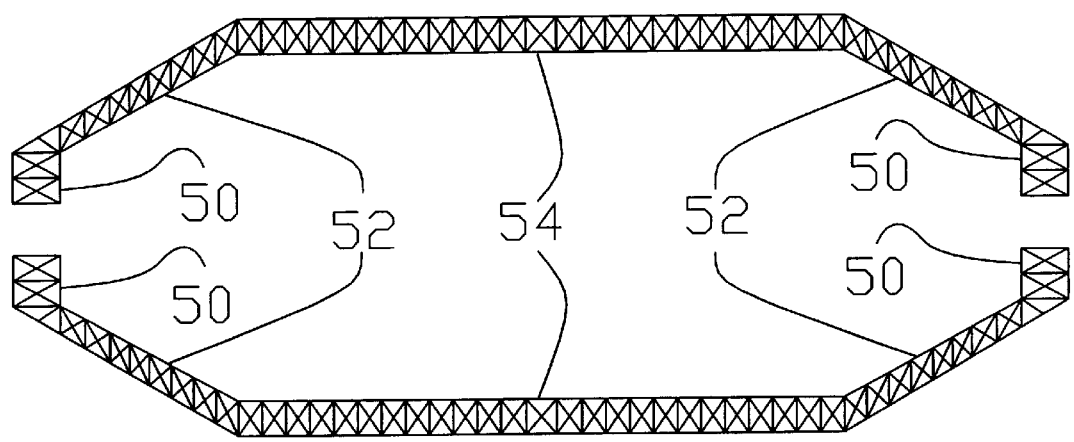
FIG. 21 is a front view of the truss support assemblies.

FIG. 21 is a front view of the forward and aft forward truss support assemblies, comprising vertical truss 50, diagonal truss 52 and the center of horizontal truss 54.

Figure 22:
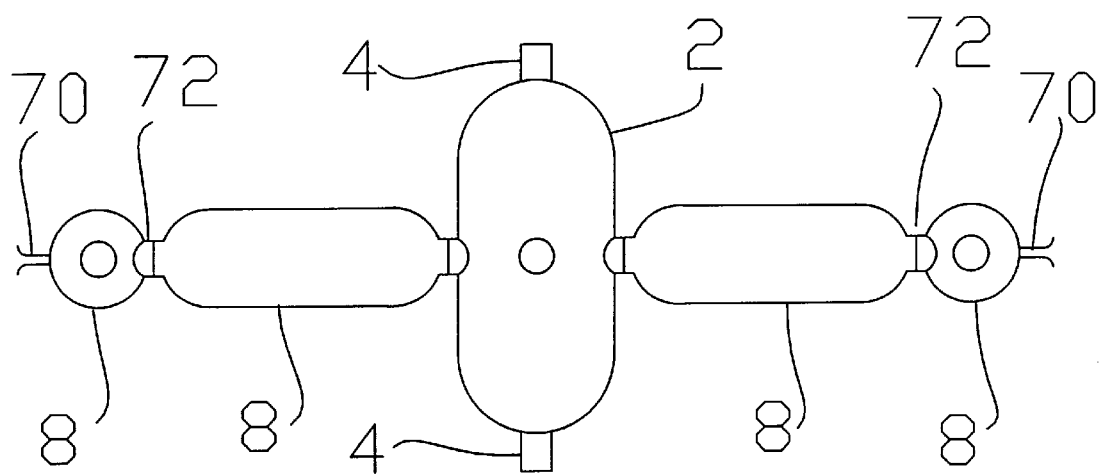
FIG. 22 is a cutaway view of the rotating assemblies minus the support structure and rockets.

FIG. 22 is an exploded view of FIG. 21, showing the rotating portion of assembly 1, with some components not shown. In the center at the 12 o'clock and 6 o'clock positions are upper and lower main module electromagnetic bearings 10. Inboard of bearings 10 are access tunnels 4. Main module 2 is shown supporting minor bearing assemblies 10 and minor module assemblies 8, connected by airlocks 72. Outboard of outboard minor modules 88 are modules 8 to magnetic ring pylons 70 connected to main electromagnetic bearing assembly 44.

Figure 23:
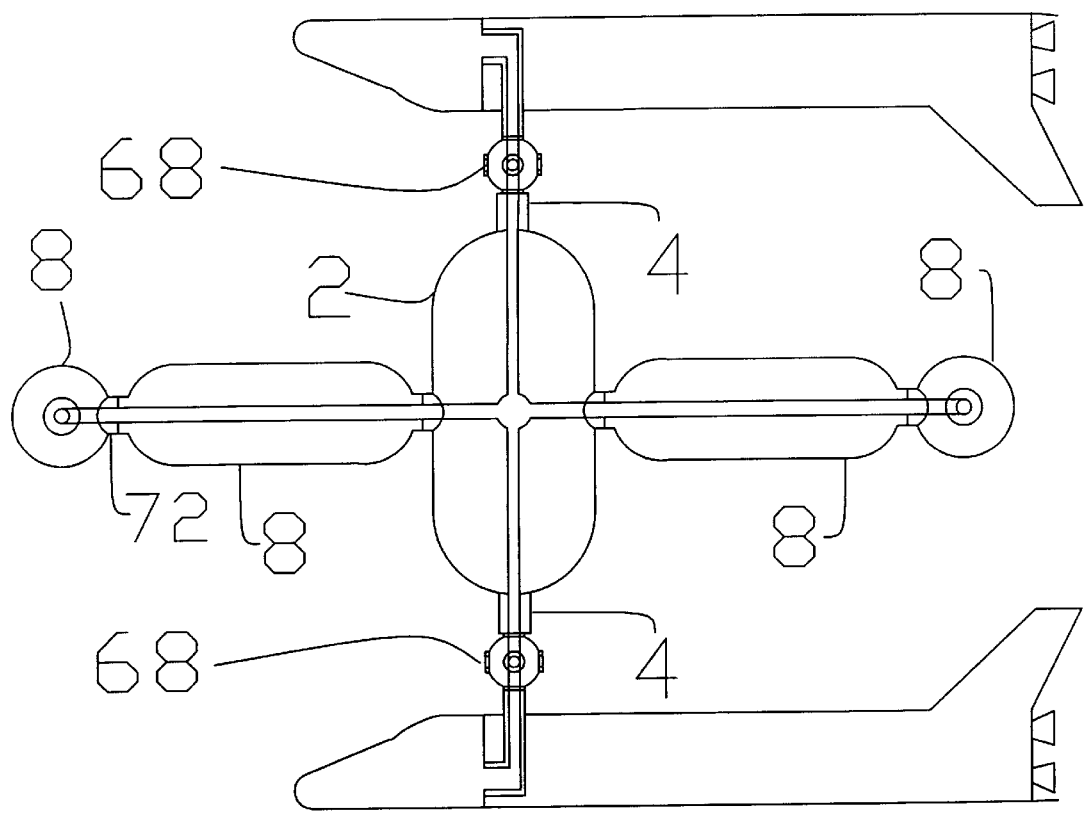
FIG. 23 is a side view of the rotating assemblies with two docked Space Shuttles, showing travel path available to crew members.

FIG. 23 is a side view of assembly 1 showing two docked shuttles to demonstrate the travel path available to the crews during crew transfer or during emergency evacuation. Shown are optional docking nodes 68, main module 2, minor modules 8, airlocks 72, and access tunnels 4. Everything else has been omitted for clarity.

Figure 24A:
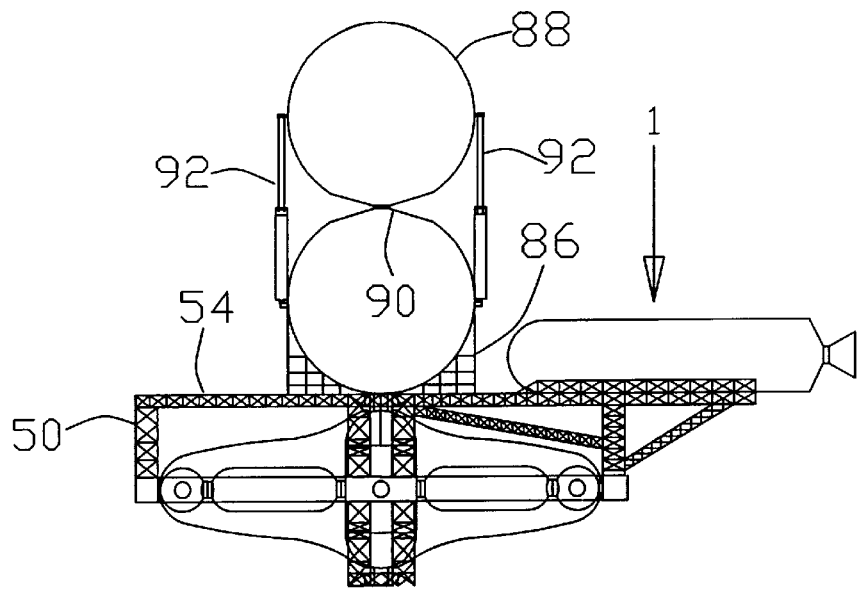
FIGS. 24A and 24B are side views of the space ship/space station with two designs of satellite repair hangars.
Figure 24B:
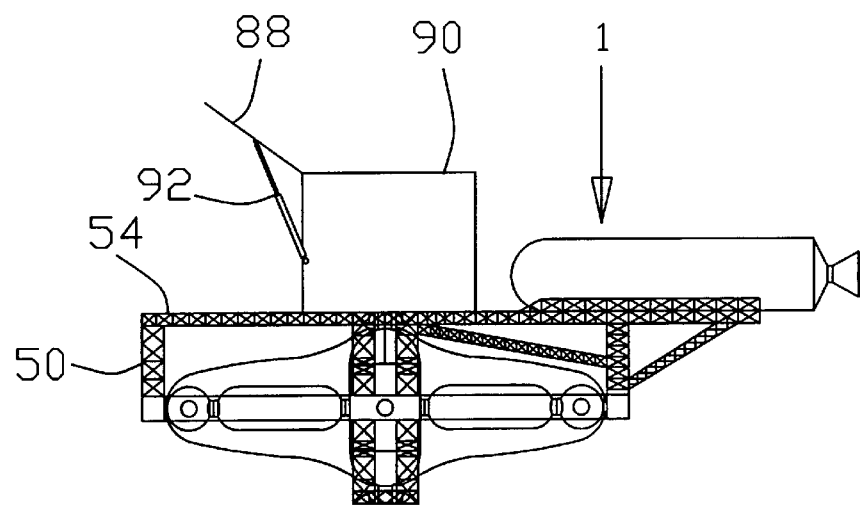

FIGS. 24A and 24B are side views of assembly 1. Depicted are two designs of repair hangar 90 that can be installed on assembly 1 of this invention, which is not possible on other rotating space stations.

FIG. 24A illustrates the cylindrical "A" version of hangar 90, held in place by truss support 86, with door 88 opening outboard and upward, by means of two actuators 92. Forward extending truss supports in the form of horizontal support 54 installed facing fore and aft, and vertical support 50 have been added to distribute the load.

FIG. 24B illustrates the rectangular "B" version of hangar 90 which does not require a truss support to hold it in place due to its flat bottom design, with door 88 opening outboard and upward using two door actuators 92. This version also has additional truss supports 52 and 50 for weight distribution. The size of hangar 90 is limited by the size of space ship/space station 1.

Figure 25A:
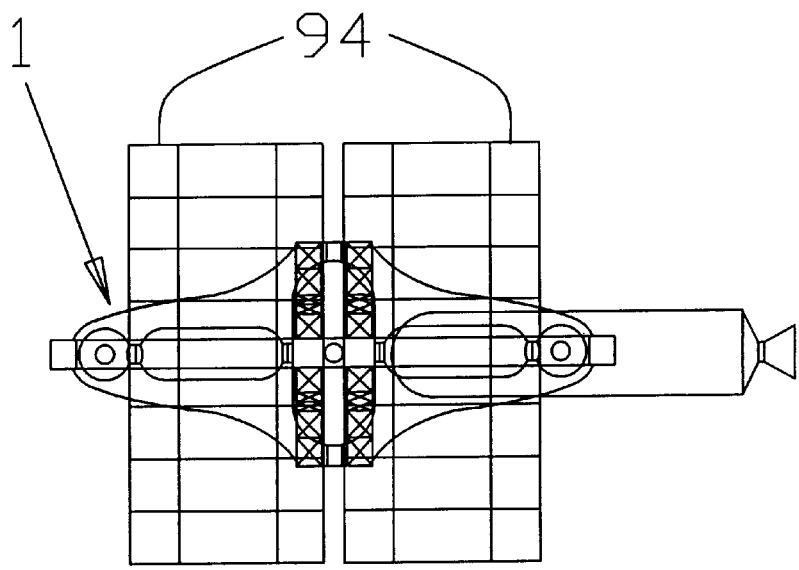
FIGS. 25A and 25B are left-hand and right hand, respectively, side views of the space ship/space station with two solar panels on each side.
Figure 25B:
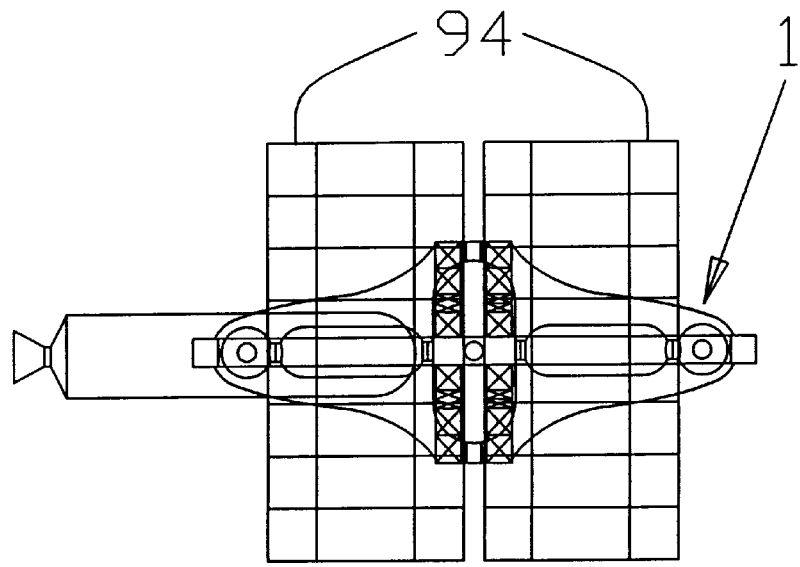

FIGS. 25A and 25B show left and right side views of assembly 1. Installed on the support truss structure are solar panels 94 which convert solar energy to electrical energy for onboard use.

Description of Space Ship/Space Station Configurations

The present space ship/space station invention has four Configurations: A,B,C and D. The configurations differ in the location of (1) the propulsion engines, or rockets, (2) number of rockets, and (3) added docking stations for visiting space ships. The rocket locations in all Configurations are arranged for maximum distance between rockets and crew locations and other structures, for maximum safety. This allows sufficient room for shielding if nuclear propulsion is used, without sacrificing space for crew areas or adding mass to the rotating modules, which would increase the electrical power necessary to power the electromagnetic bearing assemblies.

Configuration A, shown in FIGS. 1, 2 and 3, is the preferred configuration. The rockets 60 are in a dorsal location astride the longitudinal centerline and just forward of the aft end of electromagnetic bearing assembly 44. Rockets 60 are placed level with the top of horizontal truss support assembly 54 so that any blast effect damage from rockets 60 is minimized.

Configuration B, shown in FIG. 4, has the same rocket locations as Configuration A, but differs from the other configurations in that two zero gravity docking stations have been added, located on the horizontal centerline in the port and starboard quarters. The added structure includes two triangular truss support assemblies 62, two docking node support assemblies 64 and two docking nodes 68.

Also added are two crew transfer tunnels 66 with supports 74. Transfer tunnels 66 connect the outboard gravity-free docking stations to a center docking node 68. Transfer tunnels 66 and node assemblies 66 are pressurized during docking and crew transfers.

Configuration C, shown in FIGS. 5, 6 and 7, has two rockets 60 mounted on the side, installed on a rocket support truss assembly 56 which extends from the port beam to the starboard beam and follows the curvature of main electromagnetic bearing assembly 44. Rockets 60 are placed on support truss assembly 56 on the port and starboard quarters.

Configuration D, shown in FIGS. 8, 9, 10, and 11, has four rockets 60 installed on the stern, mounted on rocket truss support assembly 56 which is installed further aft on electromagnetic bearing assembly 44 than in Configuration C. Two rockets 60 are installed on the 5 o'clock position, and the other two rockets 60 on the 7 o'clock position. Two rockets 60 are mounted on pylons 74 on the upper surface, and two rockets 60 are mounted on pylons 74 on the lower surface of main electromagnetic bearing assembly 44, in a piggyback fashion.

Operation of Space Ship/Space Station

As a space ship, this invention uses two or four propulsion rockets 60 for motion of translation such as changing orbits or space travel to the moon or more distant objects. Attitude control during such motion is accomplished by pairs of thrusters, not shown in the drawings. As a space ship the invention is ideally suited to be a lunar mission transport and lunar mission support ship.

As a space station, this invention is a center for space observations, and scientific and technical experiments in varying gravity environments. It also has docking facilities for other space ships.

Experiments at one earth gravity can be carried out in the peripheral minor modules 8 on the circumference of the rotating spoke-and-wheel module network. Experiments at partial gravity between one and zero can be carried out at different radial locations in spoke modules 8 in the rotating module network. Experiments at zero gravity can be carried out in the central vertical main module 2 or outboard of the module wheel in the stationary hangars 90.

The design of the space ship/space station of this invention does not require cessation of any rotation of any part of the space ship/space station when docking takes place. A minimum of two docking spaces and a maximum of four docking spaces are provided for space vehicles, typically the Space Shuttle.

Docking operations are accomplished with the visiting Space Shuttle aligning its transfer tunnel with the stationary docking capture ring assembly 42 which is attached to horizontal truss support assembly 54. When alignment is completed, the Space Shuttle transfer tunnel is extended and capture ring assembly 42 mates and locks, thereby securing the Space Shuttle to the space ship/space station.

At this time rotating tunnel 25 is energized and its rotation set to match the rotation of access tunnel 4. When rotation is synchronized, tunnels 4 and 25 mate, after which tunnels 4 and 25 are locked together by an electrically operated pressurization seal assembly 21. Assembly 21 has evenly spaced circumferential jackscrews 22 located on the outboard edge of access tunnel 4. When actuated, jackscrews 22 advance into matching evenly spaced self-aligning nuts 28 located inboard of the evenly spaced holes in the inboard edge of rotating tunnel 25. This provides the desired seal. When the tunnels are mated and sealed, they are pressurized and crew transfers can take place.

Numerous other variations and modifications can be made without departing from the spirit of the present invention. Therefore, it should be clearly understood that the forms of the present invention described herein and shown in the accompanying drawing figures are illustrative only and are not intended to limit the scope of the present invention which is delineated in the following claims.

I claim:

1. A combined space ship and space station assembly (1) comprising:
   a main vertical module (2);
   a plurality of minor modules (8) connected to said main module (2) and forming a hub-and-spoke wheel network in a horizontal plane;
   a plurality of pylons (70) connected to said minor modules (8);
   a main electromagnetic bearing (44) attached to said pylons (70), said electromagnetic bearing (44) able to produce rotation about a vertical axis of said main module (2) and said network of minor modules (8);
   a plurality of support structures (50, 52, 54, 56, 74, 76, 78, 80, 82) attached to each other and to said electromagnetic bearing (44);
   rocket propulsion means attached to one of said support structures;
   a minor electromagnetic bearing mechanism attached to said main module (2), said minor electromagnetic bearing mechanism stabilizing said rotation of said main module (2) and said network of minor modules (8);
   connecting means for connecting said minor modules (8) to each other and to said main module (2);
   a pair of external tunnels (25) connected to one of said support structures (54); and
   a meteor shield (84) surrounding said main module (2) and said network of modules (8) to protect said main module (2) and said network of modules (8) against meteoroid damage.

2. The assembly (1) of claim 1 wherein:
   said rocket propulsion means are two rockets (60) mounted dorsally and rearward astride a longitudinal centerline of said assembly (1).

3. The assembly (1) of claim 2 further comprising:
   a zero gravity non-rotating docking station.

4. The assembly (1) of claim 3 wherein:
   said support structures comprise a vertical truss support (50), a diagonal truss support (52), a horizontal truss support (54), rocket pylon supports (56), rear rocket support (74), aft dorsal diagonal truss support (76), dorsal vertical truss support (78), aft diagonal truss support (80) and aft longitudinal truss support (82), all said support structures being interconnected to each other to form a stationary support framework for said rocket propulsion means and to contain said rotating main module (2) and said network of minor modules (8).

5. The assembly (1) of claim 4 wherein:
   said rocket propulsion means comprise at least two propulsion rockets (60) secured to cradles (58) attached to said pylon supports (56).

6. The assembly (1) of claim 4 wherein said zero gravity non-rotating docking station comprises:
   a pair of triangular supports (62) attached to said vertical truss support (50), said diagonal truss support (52) and said horizontal truss support (54);
   a pair of interchangeable node supports (64) connected to said pair of triangular supports (62);
   a pair of interchangeable docking nodes (68) connected to said pair of node supports (64);
   a pair of tunnels (66) connected to an inboard side of said pair of nodes (68); and
   a docking capture ring (42) connected to said pair of docking nodes (68), whereby docking of space ships visiting said assembly (1) is accomplished.

7. The assembly (1) of claim 1 wherein:
   said rocket propulsion means are two side-mounted rockets (60) on a horizontal plane outboard of one of said support structures (56).

8. The assembly (1) of claim 1 wherein:
   said rocket propulsion means are four rockets (60) installed rearward in two pairs, one said pair to the right and the other said pair to the left of a longitudinal axis.

9. The assembly (1) of claim 1 wherein:
   said main module (2) is a hollow cylinder tapered at both ends, each said end further comprising a hatch (6) for connection to an access tunnel (4), said main module (2) further comprising ports for attachment of said minor modules (8) to said main module (2).

10. The assembly (1) of claim 1 wherein:
    said plurality of minor modules (8) comprises minor modules (8) radiating out from said main module (2), and peripheral minor modules (8) connecting to said radiating minor modules (8) to form said hub-and-spoke network.

11. The assembly (1) of claim 10 wherein:
    said plurality of pylons (70) are equal in number to said peripheral minor modules (8) and attached to said peripheral minor modules (8).

12. The assembly (1) of claim 10 wherein:
    said connecting means are airlocks (72) providing openable connections among said peripheral minor modules (8) with means for compartmenting said minor modules (8).

13. The assembly (1) of claim 1 wherein:
    said main electromagnetic bearing (44) comprises an inner rotating magnetic ring (46) within an outer stationary magnetic ring (48), a rotation being created by a magnetic field produced by electricity onboard said assembly (1).

14. The assembly (1) of claim 1 wherein:

said connecting means are nodes (68) providing fixed connections among said peripheral minor modules (8).

15. The assembly (1) of claim 1 wherein:

said minor electromagnetic bearing mechanism comprises an inner rotating ring (12) within an outer stationary ring (14) supported by upper and lower bearing supports (18), a rotation being created by a magnetic field produced by electricity onboard said assembly (1).

16. The assembly (1) of claim 1 wherein:

said pair of external tunnels (25) comprises a pair of sealed bearings (30) and an inner rotating magnetic bearing ring (34) within an outer stationary magnetic bearing ring (36) supported by an upper bearing support (40) and a lower bearing support (38), a rotation being created by a magnetic field produced by electricity onboard said assembly (1).

* * * * *